United States Patent [19]
Strubbe

[11] Patent Number: 5,959,218
[45] Date of Patent: Sep. 28, 1999

[54] METHOD AND DEVICE FOR MEASURING THE FLOW OF BULK MATERIALS

[75] Inventor: Gilbert J. I. Strubbe, Loppem, Belgium

[73] Assignee: New Holland North America, Inc., New Holland, Pa.

[21] Appl. No.: 09/004,718

[22] Filed: Jan. 9, 1998

[30] Foreign Application Priority Data

Jan. 11, 1997 [GB] United Kingdom .................... 9700558

[51] Int. Cl.$^6$ ................................ G01F 1/30; G01F 1/28
[52] U.S. Cl. ..................... 73/861.73; 73/861.71
[58] Field of Search .......................... 73/861.71, 861.72, 73/861.73, 861.74, 861.75

[56] References Cited

U.S. PATENT DOCUMENTS

| | | | |
|---|---|---|---|
| 4,067,238 | 1/1978 | Oetiker | 73/861.73 |
| 4,765,190 | 8/1988 | Strubbe | 73/861.73 |
| 5,343,761 | 9/1994 | Myers | 73/861.73 |
| 5,495,773 | 3/1996 | Olesen | 73/861.73 |
| 5,752,545 | 5/1998 | Vienneau et al. | 73/861.73 |
| 5,763,652 | 4/1998 | Strubbe | 73/861.73 |
| 5,837,906 | 11/1998 | Palmer | 73/861.73 |

*Primary Examiner*—William Oen
*Assistant Examiner*—Robin Clark
*Attorney, Agent, or Firm*—John William Stader; Larry W. Miller; Frank A. Seemar

[57] ABSTRACT

The disclosure relates to improved methods of designing surfaces whereby to minimize the effects of changes in the coefficients of friction between so-called bulk fluids and the surfaces. The disclosure also relates to surfaces designed in accordance with the methods.

A device embodying the invention, for metering the mass flow of bulk material, such as grain or other crop material, comprises a sensor member with a curved surface installed adjacent the outlet of a conveyor. The sensor member is mounted for pivoting about a transverse axis and is subject to a moment resulting from the material flow along its surface. A spring means is provided to keep the sensor member in zero load position. The displacement of the sensor member is proportional to the mass flow rate. Changing friction coefficients $\mu$ between the bulk material and the surface will affect the flow pattern therealong, but an array of length and/or inlet orientation angles can be found relative to which the measured moments remain substantially insensitive to these flow changes.

Such metering devices may be used in grain and forage harvesters, wherein they need less recalibration under varying harvesting conditions.

26 Claims, 12 Drawing Sheets

METHOD AND DEVICE FOR MEASURING THE FLOW OF BULK MATERIALS

BACKGROUND OF INVENTION

1. Field of Invention

This invention relates to the surface and method for measuring a flow of bulk material. More specifically for surfaces for use in devices for metering (measuring) the mass flow ("bulk flow") of so-called bulk material. The invention also relates to designing a surface for use in impellers and propellers, and to methods of obtaining such surfaces.

2. Description of Prior Art

An example of the mass flow of bulk material is the flow of grain to the grain tank in a combine harvester. Surfaces in accordance with the invention are particularly suitable for use in flow meters that operate by measuring forces of this flow on a sensor surface. Surfaces in accordance with the invention may also be employed in e.g. hoppers, silos, harvesting and cutting machinery other than combine harvesters, conveying machinery and various kinds of manufacturing, and medical apparatuses.

Bulk flow may also embrace the flow of bulk grain and chemicals in transport vehicles (such as tankers, ships and railway tanker wagons); the flow of powders, and materials of larger particle size such as fruit, vegetables, coal, minerals and ores; and even the flow of liquids of high viscosity. Thus the invention may be of use in the measuring of characteristics of bulk flow in liquids whose viscosity changes. In general terms, bulk flow of material may in this context be regarded as any flow of matter in contact with a surface, in which the effects of friction between the surface and the material usually influence the maximum flow rate, and in which the matter exhibits free flow behaviour. Those skilled in the art will know that various parameters, such as the tendency of grains of bulk material to cohere and to adhere to the surface; and the effects of friction between individual grains, also influence the mass flow rate of bulk materials. However, the effects of such parameters are small compared with the effects of friction between the bulk material and the surface along which it travels.

The flow rate established by such flow a metering device as referred to above may be displayed continuously to an operator and may be used for establishing the total material flow over a time period. In a combine harvester, the operator may want to determine the amount of grain being collected in relation to the time being spent or the area being covered. Distinct mass flow measurement in combination with a measurement of the combine speed, the header width and the combine position can be used to establish the yield rate of the crop across the field being harvested. In this case, the mass flow meter has to be able to provide reliable yield data, not only over the total field, but also over relatively small field lots. The results may be used to create a yield map which the farmer can use for future crop treatment, such as targeted fertilizing and spraying of bad field lots.

Mass flow readings from prior art combine harvester mass flow measuring devices are known to be influenced by a variety of crop and harvest conditions, such that frequent recalibration of the flow meter is required in order to obtain reliable yield rate results under various circumstances.

For example, volumetric measurement devices as disclosed in European Patent application 0,042,245 and German application 3,045,728, meter the volume rate only. For the conversion to a mass rate the volume reading is multiplied by the specific mass value of the harvested crop. Under adverse crop conditions the yield rate will decrease. The grain kernel size may also be variable, such that the specific mass is affected and the measurement device needs readjustment.

Other mass flow meters, as shown in German application 2,947,414 and European application 0,208,025, comprise a straight or curved surface which is engaged by the mass flow. The resulting force in a predetermined direction is sensed by a sensor which generates a signal which is substantially proportional to the mass flow. In these systems the sensors are disposed along the bisector of the active portion of the surface.

These surfaces are subjected to the combination of centrifugal, gravity and friction forces of the layer of material flowing therealong. A decrease or increase of the friction coefficient $\mu$ between the bulk material and the metering surface will inevitably influence the material speed and the layer thickness along the surface and will consequently alter the centrifugal, gravity and friction forces. Thus the resulting total force in the direction of the bisector varies accordingly, so that recalibration of the flow meter may be required.

Such variations of the friction coefficient $\mu$ may occur in a harvesting machine when another crop variety is harvested, or when harvesting takes place under varying external conditions such as ambient temperature and humidity, field relief and orientation, neighbouring woodland, etc. A change in the settings of the harvester may result in the occurrence of more or less chaff in the grain sample, which will equally influence its friction characteristics and hence the measurement of the mass metering device.

SUMMARY OF THE INVENTION

According to a first aspect of the invention, there is provided a member comprising a surface permitting streamline flow of bulk material along its length, the member being retainable in an apparatus the functioning of which depends on a force acting on the member or a moment or a torque derivable from the said force, said force, moment or torque resulting from flow of bulk material along the surface, the member being such that for a given mass flow rate of bulk material the force, moment or torque is substantially independent of the coefficient of friction between the bulk material and the surface, characterised in that the length of the surface is chosen so as to minimise the effect of changes in the coefficient of friction on the force, moment or torque.

It is an advantage of this invention to permit construction of a metering (measuring) device which is less influenced than prior art devices by changes in crop and harvest conditions, such that fewer recalibrations are necessary for a good reading accuracy. Indeed, in some circumstances the need for recalibration may be eliminated entirely. This is particularly important as the circumstances which influence the yield of a field lot may also influence the meter readings during harvesting operations, such that errors in the readings tend to magnify.

A flow metering device including a surface according to the invention also does not hamper the normal flow of the crop material through the machine and is free of contamination.

According to a second aspect of the invention, there is provided a member comprising a surface permitting streamline flow of bulk material along its length, the member being securable in an apparatus the functioning of which depends on a force acting on the member or a moment or a torque derived from the said force, said force, moment or torque resulting from flow of bulk material along the surface, the member being such that for a given mass flow rate of bulk material the force, moment or torque is substantially independent of the coefficient of friction between the bulk material and the surface, wherein i) the surface includes an inlet portion at one end thereof; and ii) the normal to said end of the surface is inclined at an angle (δ) to a reference direction, characterised in that the angle (δ) is such as to minimise the effect of changes in the coefficient of friction on the force, moment or torque.

When the member is configured as the sensor of a mass flow metering device, it may be mounted for pivoting about an axis, in which case its centre of gravity preferably is disposed on said pivot axis, in order to attenuate the effect of longitudinal and vertical oscillations of the machine. The location of the centre of gravity may be modified by the use of counterweights applied to the member.

An advantageous location for the pivot axis is situated near the tangent to an outlet portion of the surface. In a particular case optimal friction compensation could be obtained by providing the pivot axis on a line which crosses the outlet surface at a distance of about ⅘ of the surface radius from the centre of curvature of the surface adjacent the outlet, and which has an angle of substantially 8 degrees to said tangent.

The component of the resulting force in a direction generally perpendicular to the outlet direction is equally not very sensitive to changes in the friction coefficient $\mu$. Advantageously one may measure the force component in a direction falling in the range of 75 degrees to 90 degrees to the outlet direction.

The feeder means may comprise stationary guide means or impeller means in order to redirect the flow from a conveyor to the inlet of the sensor member. This conveyor may be a paddle conveyor equipped with paddles having curved surfaces for better concentration of the material flow near the outlet of the feeder means.

The sensing means may comprise displacement or force sensors. In the case of a pivotable sensor member, the sensing means may equally comprise a torque sensor.

According to a third aspect of the invention, there is provided a method of providing a member in particular as defined hereinabove, comprising the steps of, in any convenient order, (i) for a first value of friction coefficient between a material and the surface of the member, and for a first value of the length of the surface determining a plurality of velocity values corresponding to the velocity of the material at each of a plurality of positions along the surface;

(ii) using the velocity values to determine the force acting on each of a plurality of elements of the surface;

(iii) integrating the force values, or further parameter values derived therefrom, over the length of the curved surface, whereby to obtain a total force value or total further parameter value;

(iv) repeating steps (i) to (iii) for a at least one further friction coefficient value, whereby to obtain a plurality of total force or total further parameter values;

(v) repeating steps (i) to (iv) for a plurality of further values of the length of the surface;

(vi) identifying one or more optimal values of the length of the surface for which the total force values or other parameter values corresponding to the different friction coefficients are generally the same; and (vii) manufacturing a member the surface of which is of a said optimal length.

According to a fourth aspect of the invention there is provided a method of providing a member comprising the steps of, in any convenient order, (i) for a first value of friction coefficient between a material and the surface of the member, and for a first value of the angle of inclination of an inlet of the surface relative to a reference direction, determining a plurality of velocity values corresponding to the velocity of the material at each of a plurality of positions along the surface;

(ii) using the velocity values to determine the force acting on each of a plurality of elements of the surface;

(iii) integrating the force values, or further parameter values derived therefrom, over the length of the curved surface, whereby to obtain a total force value or further parameter value;

(iv) repeating steps (i) to (iii) for a plurality of further friction coefficient values, whereby to obtain a plurality of total force values or total further parameter values;

(v) repeating steps (i) to (iv) for a plurality of further values of the angle of inclination of an inlet to the surface;

(vi) identifying one or more optimal values, of the angle of inclination of the inlet, for which the total force values or other parameter values corresponding to the different friction coefficient values are generally the same; and (vii) manufacturing a member an inlet to the surface of which is inclined at a said optimal angle.

For the avoidance of doubt, the methods of the invention also extend to the following:

A method of providing a sensor member of a mass flow measuring device, the sensor member having a curved flow deflecting surface and being mounted to react to forces and/or moments applied thereto resulting from flow of a mass of a material on the curved surface, the method further comprising the steps of:

i) for a first value of friction coefficient between the said material and the curved surface, determining a plurality of velocity values corresponding to the velocity of the material at each of a plurality of positions along the curved surface;

ii) using the velocity values to determine a corresponding plurality of force values;

iii) integrating the force values over the length of the curved surface, whereby to obtain a total force value measured with respect to a first reference direction relative to the curved surface; or integrating further parameter values derived from the force values, over the length of the curved surface, whereby to obtain a total further parameter value measured with respect to the first reference direction or a first reference point relative to the curved surface, as appropriate;

iv) repeating steps (i) to (iii) for one or more further friction coefficient values, whereby to obtain a plurality of total force or total further parameter values measured with respect to said first reference direction or first reference point as appropriate;

v) repeating steps (i) to (iv) for a plurality of further reference points or reference directions as appropriate;

vi) identifying one or more optimal reference directions or reference points for which the total force values or total further parameter values for the different friction coefficients are substantially the same; and vii) in use mounting the curved surface so that forces and/or moments acting thereon may be detected in a chosen said optimal direction or about a chosen said optimal point, as appropriate.

A method as defined hereinabove wherein the further parameter is a moment about a said reference point.

A method as defined hereinabove wherein the step (vii) includes securing the curved surface for pivoting movement about an axis generally coinciding with the moment axis passing through the chosen optimal point.

A method as defined hereinabove including the sub-step of defining the respective reference points by means of polar co-ordinates measured from the centre of curvature of the curved surface.

A method as defined hereinabove wherein the step of repeating steps (i) to (iv) for a plurality of further reference points includes the sub-step of maintaining constant the radial component of the polar co-ordinates of the reference points, and varying the angular component whereby to vary the reference point.

A method as defined hereinabove wherein the radial components of the polar co-ordinates are expressed as the ratio of the distance of the reference point from the centre of curvature of the curved surface to the radius of curvature of the curved surface.

A method as defined hereinabove wherein step (i) comprises the sub-step (viii) of determining the plurality of velocity values from the equation of motion of the material along the curved surface.

A method as defined hereinabove including determination of the velocity values using numerical methods.

A method as defined hereinabove employing the velocity of material at an inlet of the curved surface as the start velocity in the equation of motion.

A method as defined hereinabove wherein the further parameter is a torque.

A method as defined hereinabove, including the further step of:

(ix) providing a detector for forces and/or moments, the detector serving to detect forces in the chosen said optimal direction or to detect moments about said chosen optimal location.

A sensor member for a mass flow metering device obtained by the method defined hereinabove.

A mass flow measuring device comprising a sensor member defined hereinabove.

BRIEF DESCRIPTION OF THE DRAWINGS

There now follows a description of preferred embodiments of the invention, by way of example, with reference being made to the accompanying drawings in which.

DETAILED DESCRIPTION OF THE INVENTION

The terms "grain", "straw", and "tailings" are used principally throughout this specification for convenience and it should be understood that these terms are not intended to be limiting. Thus "grain" refers to that part of the crop which is threshed and separated from the discardable part of the crop material which is referred to as "straw". Incompletely threshed ears are referred to as "tailings". Also, the terms "forward", "rearward", "upper", "lower", "left", or "right" when used in connection with the combine harvester and/or components thereof, are determined with reference to the combine harvester in its normal operational condition and may refer either to the direction of forward operative travel of the combine harvester or to the direction of normal material flow through components thereof. These terms should not be construed as limiting.

Figure 1:
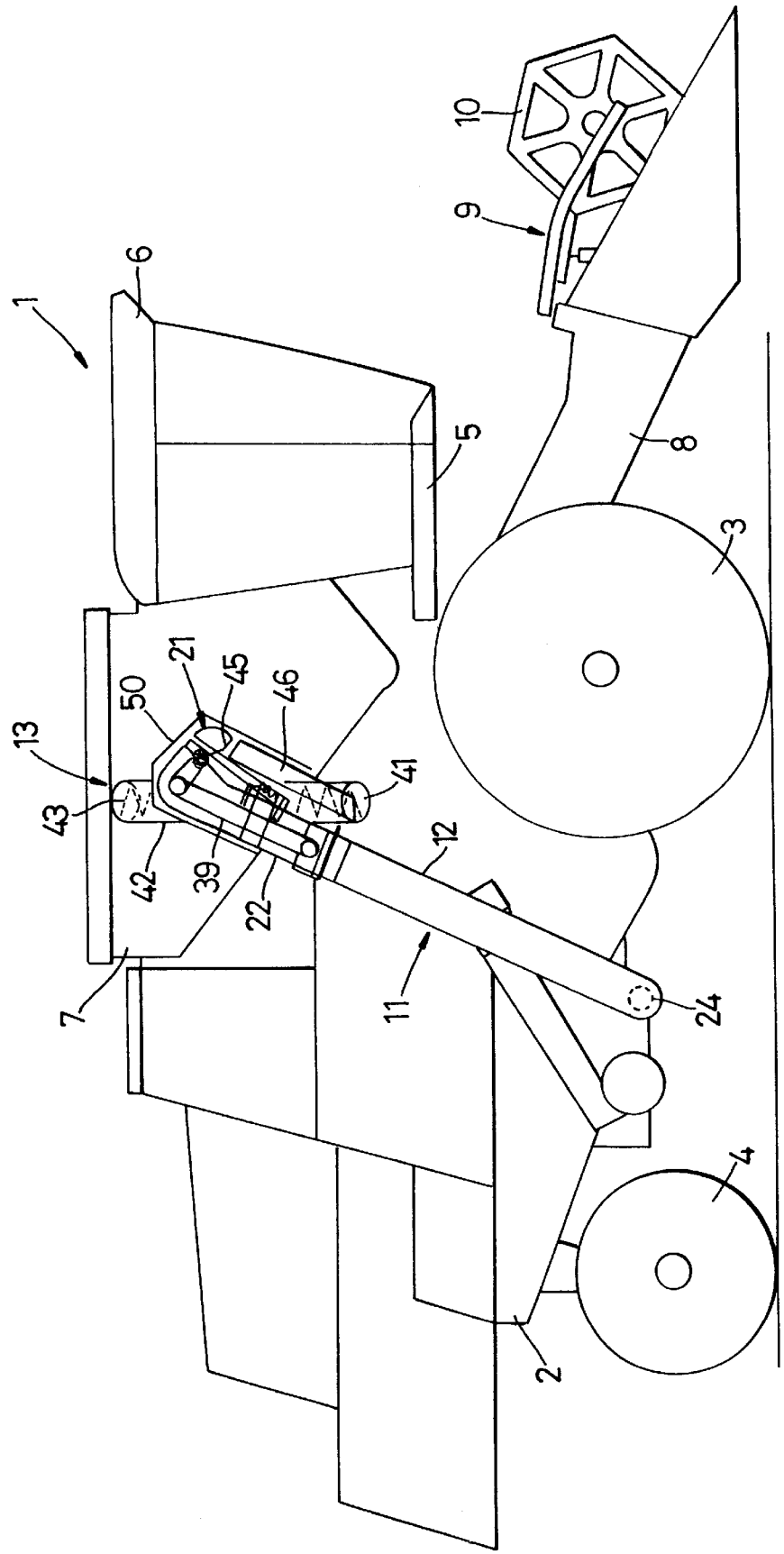
FIG. 1 is a side elevational view of a combine harvester embodying a mass flow rate metering device, including a surface according to the invention, in combination with a clean grain elevator.

A typical combine harvester 1 as is shown in FIG. 1, comprises a main chassis or frame 2 supported on a front pair of traction wheels 3 and a rear pair of steerable wheels 4. Supported on the main chassis 2 are an operator's platform 5 with a cab 6, a grain tank 7, a threshing and separating mechanism (not shown), a grain cleaning mechanism (not shown) and an engine (also not shown). The engine provides the motive power for the various driven components of the machine as well as for the traction wheels 3. A conventional header 9 and straw elevator 8 extend forwardly of the main chassis 2. The header 9 and straw elevator 8 are pivotally secured to the chassis 2 for generally vertical movement which is controlled by extensible hydraulic cylinders. As the combine harvester 1 is propelled forwardly over a field with standing crop, the latter is severed from the stubble by a sickle bar on the header 9, whereafter a reel 10 and a header auger convey the cut crop to the straw elevator 8 which supplies it to the threshing and separating mechanism. The crop received within the threshing and separating mechanism is threshed and separated; that is to say, the crop (which may be wheat, corn, rice, soybeans, rye, grass seed, barley, oats or other similar crops) is rubbed and beaten, whereby the grain, seed or the like, is loosened and separated from the straw, stalks, coils or other discardable part of the crop.

Grain which has been separated from the straw falls onto the grain cleaning mechanism (not shown) which comprises means to separate chaff and other impurities from the grain, and means to separate unthreshed crop material (tailings). Cleaned grain is then conveyed to the grain tank 7 by a clean grain conveyor 11 comprising a lower paddle type elevator 12 and an upper, so-called "bubble-up" auger 13. The tailings either may be returned via a tailings conveyor to the threshing mechanism for reprocessing, or otherwise may be reprocessed in a separate tailings rethresher and returned to the cleaning mechanism for a repeat cleaning action. The clean grain conveyor 11 is fitted with a mass flow metering device, indicated generally at 21 in FIG. 1 and shown in greater detail in FIGS. 2 and 3. The grain metering device 21 is provided generally at the outlet opening 28 of the paddle-type elevator 12.

A similar metering device may be provided on the tailings conveyor to measure the tailings flow rate. However, as both metering devices principally are identical, only the clean grain metering device will be described hereafter with reference to FIGS. 2 and 3.

Figures 2, 3:
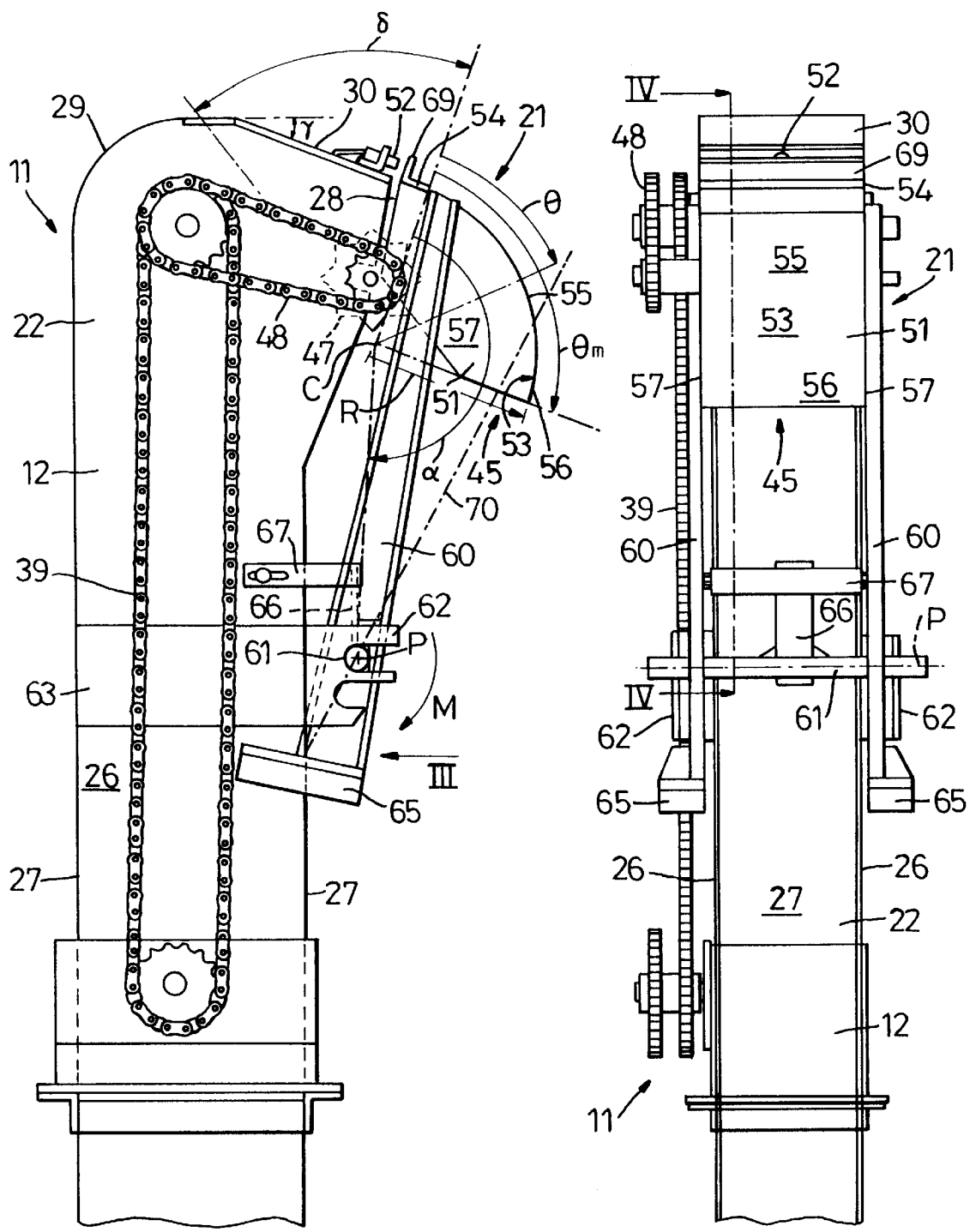
FIG. 2 is a side view on a larger scale of the metering device and its flow deflecting surface of FIG. 1.
FIG. 3 is a view of the metering device, taken in the direction of arrow III in FIG. 2.
Figure 4:
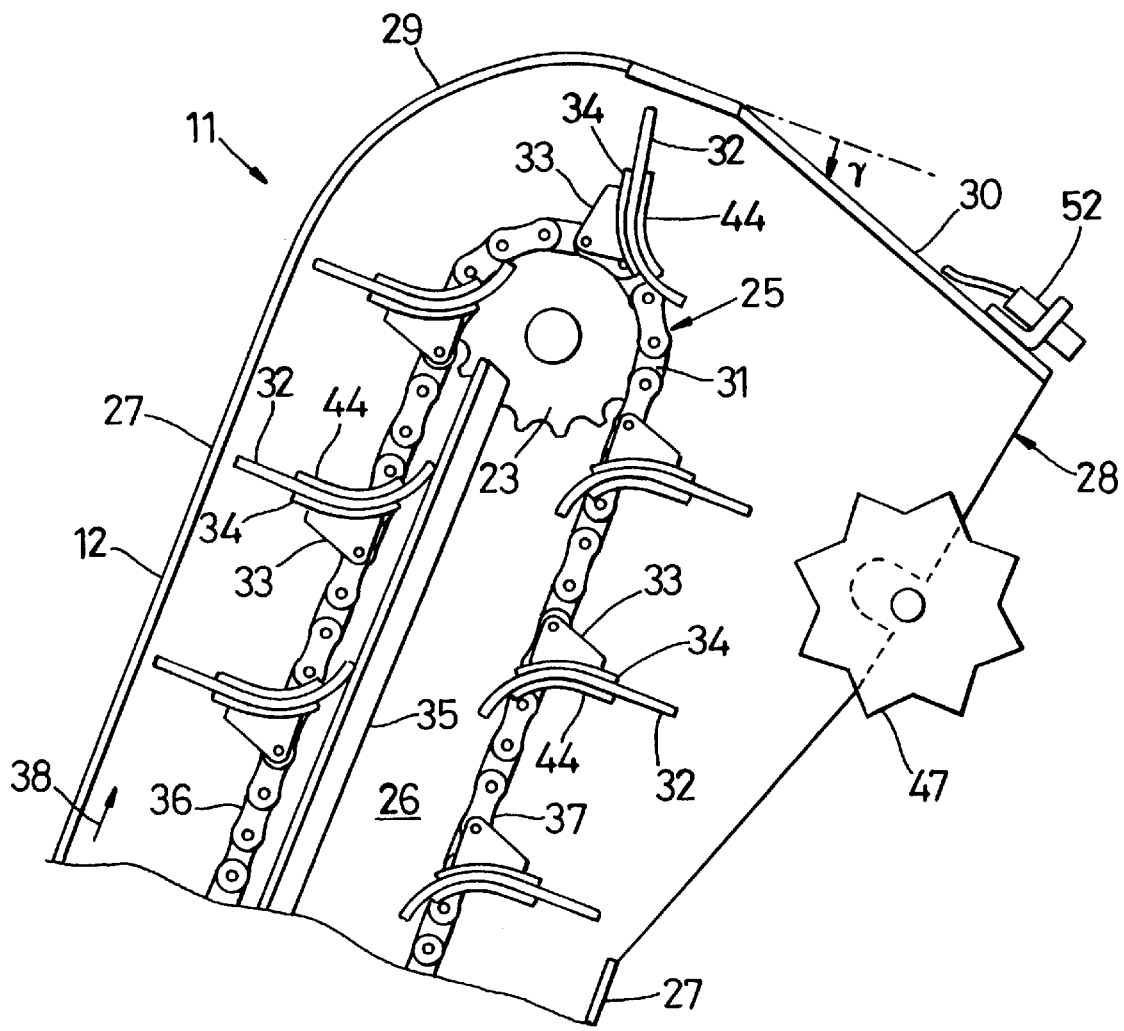
FIG. 4 is a partial sectional view of the metering device taken along lines IV—IV in FIG. 3.

The clean grain conveyor 11 is otherwise conventional in many respects. As shown in FIGS. 2, 3 and 4 the paddle-type elevator 12 comprises an elongated housing 22 of generally rectangular cross section. Upper and lower sprockets, respectively 23 and 24, are mounted in the housing 22 in alignment with respect to each other for an endless paddle conveyor 25 to extend therearound. The housing 22 has a pair of opposed side walls 26 which extend parallel to the plane defined by the paddle conveyor 25. One of said side walls 26 has a circular inlet opening generally coaxial with the lower sprocket 24. A transverse wall 27 interconnects both side walls 26 and arcuately extends around the lower sprocket 24 and the upper sprocket 23. A generally rectangular outlet opening 28 is provided in the transverse wall 27 at the upper end of the elevator housing 22 and downstream of an upper curved section 29 and an upper straight section 30 of said transverse wall 27. The straight section 30 is disposed at an angle γ of approximately 20 degrees to the tangent of the curved section 29.

As shown in FIG. 4, the paddle conveyor 25 comprises an endless chain 31 on which the paddles 32 are mounted at regular intervals on pairs of angled brackets 33 carried by the appropriate chain links with each pair attached to a metal support plate 34 which is curved forwardly in the direction 38 of the conveyor transport. A paddle 32 is immovably riveted between the curved support plate 34 and a similarly curved press plate 44. The paddle 32 is composed of a flexible material, which is nevertheless sufficiently rigid for the intended load carrying function. Each paddle 32 is spaced from the two opposed side walls 26 and from the transverse interconnecting wall 27. However, each paddle 32 is in sliding contact with an intermediate wall 35 which divides the operative and return runs 36, 37 of the elevator 12. The paddle conveyor 25 is driven in the direction 38 via a chain-and-sprocket transmission 39 communicating motive power to the upper sprocket 23 and whereby, in operation, the paddles 32 convey grain through the operative run 36 along the intermediate wall 35 and finally discharge said grain along the straight section 30 and through the outlet opening 28.

Grain, which is elevated by the paddle-type elevator 12, is transferred via an outlet 45 of the flow metering device 21, which will be described in more detail hereafter, and a duct or channel 46 to the "bubble-up" auger 13, which is inclined inwardly of the machine and has a discharge end generally above the centre of the grain tank 7. The "bubble-up" system 13 comprises an inlet basket 41 disposed in receiving relationship to the channel 46 and which itself communicates with a tubular body 42 comprising an auger 43 which is driven in a conventional manner.

An impeller rotor 47 is mounted for rotation between the side walls 26 and below the straight wall section 30 in the proximity of the outlet opening 28 for engagement of the lower portion of the material passing therethrough. The rotor 47 is drivingly connected via a second chain-and-sprocket transmission 48 to the transmission 39 of the paddle conveyor 25. This second transmission 48 is dimensioned as to give to the impeller rotor 47 a circumferential speed which is substantially equal to the speed of the outer edge of the paddles 32 along the upper curved section 29 of the elevator housing 22.

The top of the grain conveyor 11 and the metering device 21 extend into the grain tank 7 as can be seen in FIG. 1. They are shielded from the surrounding grain by a box-like structure 50 which has at its lowermost point a small opening to the grain tank 7, such that grain kernels scattered between the conveyor 11 and the metering device 21 into the structure 50 can evacuate to the grain tank 7 when the latter is emptied.

As shown in FIG. 2, the mass flow metering device 21 essentially comprises a pivotably mounted sensor member 51, disposed to be subjected to the centrifugal, gravity and friction forces of the layer of crop material from the conveyor 12, and a sensor 52 operable to sense the displacement of the sensor member 51 as a result of the forces acting thereon.

In the embodiment shown, the sensor member 51 comprises a sheet metal structure which is generally U-shaped in cross-section and which has an inlet portion 54 adjacent the outlet opening 28 of the paddle-type elevator 12 without however making any physical contact with any wall portion thereof. The bottom surface 53 of the U-shape (actually generally the upper wall portion thereof as the U-shape is positioned generally upside-down) has a transverse width which is a little greater than the width of the outlet opening 28. The surface 53 comprises the inlet portion 54, which is generally rectilinear in shape and may be disposed with its upper edge only slightly above the upper edge of the outlet opening 28 and at a small angle not exceeding 10 degrees to the upper straight section 30 of the transverse elevator wall 27. The surface 53 further comprises intermediate and outlet portions 55, 56, which are circularly curved with a constant radius R about a total angle $\theta_m$ of 90 degrees (in the embodiment shown) and have their centre at C. Other forms of curvature may, of course, be employed, e.g. elliptical, parabolic, hyperbolic, spiral, cycloidal or curves defined by exponential or other algebraic functions, or combinations of such curves. The curvature may in theory be convex, or concave as shown in the illustrated embodiment. However, for a surface employed in a mass flow measuring device, concave surfaces are likely to be more practical. The curved intermediate portion 55 starts at an angle δ of substantially 55 degrees to the vertical in the embodiment shown, although other values for δ may be used, as described herein. (The grain conveyor 11 in FIG. 2 is not represented in the position which it takes when mounted to the frame 2.)

Connected to the inlet, intermediate and outlet portions 54, 55, 56 of the bottom surface 53 are opposed side walls 57 forming the limbs of the U-shape and extending towards the elevator side walls 26 without making any physical contact therewith.

Two support arms 60 are welded at their upper ends to the side walls 57 and extend parallel to each other in the direction of the conveyor housing 22. The lower portions of the support arms 60 are interconnected by a transverse shaft 61, which is pivotably held in a pair of brackets 62 protruding forwardly from both side walls 26 of the housing 22. The brackets 62 are the front portions of a generally U-shaped mounting frame 63, which fits over the rear wall 27 and the side walls 26 of the housing 22 and is affixed thereto. The brackets 62 constitute a bearing for the pivoting of the sensor member 51 about the pivot axis P, which coincides with the centre of the shaft 61.

The support arms 60 extend further below the pivot shaft 61 and are provided at their lower ends with a pair of counterweights 65 which make the centre of gravity of the complete sensor member 51, comprising the bottom surface 53, the side walls 57, the arms 60 and the counterweights 65, coincide with the pivot axis P. When the combine harvester 1 is travelling over a field, the sensor member 51 will be subject to all kinds of oscillations due to the movement of the combine frame 2, but because of this particular location of its centre of gravity, the sensor member 51 will not react to longitudinal, transverse or upward oscillations.

The pivot shaft 61 is welded to the support arms 60 and holds the lower portion of an upright leaf spring 66. The upper portion thereof is held by a U-shaped bracket 67, which is adjustably mounted to the conveyor housing 22. The horizontal slots in the arms of the bracket 67 enable the repositioning of the leaf spring 66 for the adjustment of the zero load position of the sensor member 51.

The displacement sensor 52 is installed on top of the upper straight section 30 of the transverse wall 27 and faces an angle iron 69 attached to the inlet portion 54 of the sensor member 51. This sensor may be an inductive, capacitive, Hall-effect or ultrasonic sensor or any other kind of sensor which generates a signal proportional to its distance to a facing object. Alternatively the sensor 52 may be attached to a lower portion of the elevator housing 22 and sense the movement of one of the support arms 60.

Figure 5:
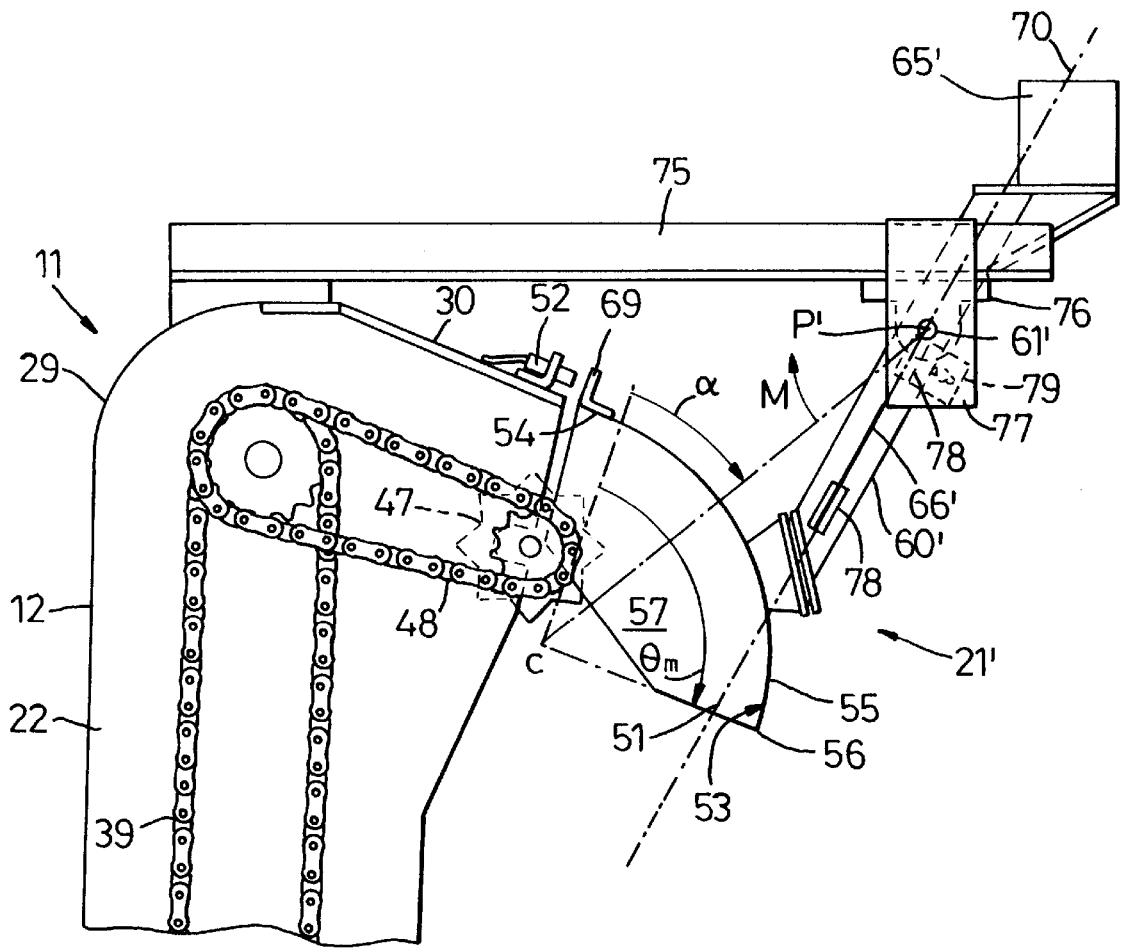
FIG. 5 shows an alternative embodiment of the metering device of FIG. 2.

Another configuration of a sensor member 21' according to the invention is illustrated in FIG. 5. The mass flow metering device 21' comprises a similar sensor member 51' with an identical bottom surface 53 and identical side walls 57. Its middle portion 55 is attached to a forwardly and upwardly extending support arm 60' which is pivotably mounted by a transverse shaft 61' to a bearing 76, which is immovably fastened to a forwardly extending support beam 75. The latter is bolted or welded to the top portion of the conveyor housing 22. The centre of the shaft 61' constitutes a pivot axis P' for the sensor member 51'. A counterweight 65' is attached to the upper end of the support arm 60' opposite the surface 53 for placing the centre of gravity of the complete sensor member 51' at the pivot axis P'.

A leaf spring 66' is affixed by a pair of clamps 78 to the lower portion of the support arm 60' and extends therealong in the direction of the pivot axis P'. The upper portion of the leaf spring 66' is affixed by another pair of clamps 78 to a clamp holder 79, which is bolted to a bracket 77 attached to the upper support beam 75. A slot in the holder 79 permits relative movement of the second pair of clamps 78 to the bracket 77 for adjustment of the zero load position of the sensor member 51'.

The sensor 52 may be mounted on top of the elevator housing 22 in order to sense the movement of inlet portion 54 of the sensor member 51', or may be positioned behind or in front of the support arm 60' in order to sense the movement of the latter.

During harvesting operations, the curved elevator paddles 32 are operable, as is conventional, to convey successive portions of clean grain along the intermediate wall 35. The bent profile of the paddles 32 keeps a major portion of each grain portion away from this wall 35 such that its mass centre lies closer to the middle of each paddle 32 than in the prior art conveyors with straight paddles. As this grain is conveyed around the upper sprocket 23, it is moved radially outwardly under influence of centrifugal forces imparted thereto by the paddles 32, which at that point in the elevator 12, pivot around the shaft of the upper sprocket 23. Thereby the successive quantities of grain carried by the successive paddles 32 are urged towards the upper curved section 29 of the transverse elevator wall 27 to form there a layer of grain kernels.

During the pivoting of a paddle 32, the grain kernels resting thereon move along its upper surface toward its outer edge. However, the kernels which initially occupied the area close to the intermediate wall 35 are subject to smaller centrifugal forces than the kernels closer to the outer edge of the paddles 32. Hence their movement is retarded and not all of them may reach the upper curved wall section 29 before the elevator paddles 32 enter the return run 37. These kernels are projected in the direction of the outlet opening 28 at various speeds and various angles such that the resulting grain flow is not fully coherent. It therefore is desirable to limit the quantity of crop material which is accumulated near the intermediate wall 35 in the operative run 36 of the conveyor 12 and shift a portion thereof towards the outer transverse wall 27 as can be done by the use of curved paddles 32.

The layer of crop material at the inside of the curved wall section 29 is projected to and along the straight wall section 30, which in the illustrated embodiment has an inclination angle γ of approximately 20 degrees to the outlet direction of the curved section 29 to concentrate this layer even further and to receive therein most of the grain kernels which were projected at a small deviation angle because they could not reach the tip of the paddle 32 before the latter entered the return run 37. The velocity of the crop material along the straight section 30 is influenced not only by the impact of these 'diverging' kernels, but also by the friction forces between the surface of the section 30 and the mass flow, such that the resulting velocity $v_0$ at the outlet opening 28 will be dependent on the friction coefficient $\mu$ of these materials. A higher friction coefficient $\mu$ will result in a slower inlet velocity $v_0$ for the sensor member 51 and thicker material layer; a lower friction coefficient $\mu$ will result in a higher inlet velocity $v_0$ and a thinner material layer for the same mass flow rate and a constant conveyor speed.

At low conveyor speed or at high mass flow rate, the portion of the material flow which is projected in a lower direction and does not reach the layer along the straight section 30 before the outlet opening 28 may not be negligible. However this portion is engaged by an impeller rotor 47 and is thrown upwardly and forwardly into the material layer thereabove at a velocity which is substantially equal to the velocity of the outer edges of the paddles 32 during their pivoting around the shaft of the upper sprocket 23. Thus is obtained a substantially coherent flow through the outlet 28 of the conveyor 12.

This layer is forcefully ejected in a direction generally tangential to the straight wall section 30 whereby it engages the sensor member 51 immediately behind the inlet portion 54 thereof and whereafter it is deflected inwardly by the intermediate and outlet portions 55, 56 and guided further therealong through a curved path until it reaches the inlet of the channel 46 to the "bubble-up" system 13.

The layer of grain kernels thus deflected and guided along the sensor member 51 exerts a local force dF on each angular section dθ of its curved surface 53. This local force is a combination of the local centrifugal, gravity and friction forces and is closely related to the local velocity of the grain kernels along the surface 53 and the side walls 57, as on the one hand the local velocity determines the local thickness of the layer for a constant mass rate and hence the grain mass acting on the angular section dθ and on the other hand, the local velocity determines the values of the local friction force, which is proportional to the velocity itself, and of the local centrifugal force, which is proportional to its square. This local velocity in turn varies along the curved surface in relation to the tangential component of the local force component. It is thus clear that the total force of the material flow on the sensor member 51 is not distributed evenly over its full surface, but that it varies substantially between the start of the contact (at angle δ to the vertical and θ=0) and the outlet of the surface 53 (at θ=θ$_m$). The resulting total force and its distribution are also influenced by changes to the friction coefficient μ between the material and the surface 53. A high friction coefficient μ will result in high initial friction forces and a quickly diminishing flow velocity, such that the resulting centrifugal and friction forces will be substantially smaller in the last portion of the sensor member 51. A low friction coefficient μ will not dramatically restrain the material flow, which may even accelerate as a result of gravity forces on the layer, such that the resulting centrifugal and friction forces are greater in the last portion of the sensor member 51.

In the metering devices 21, 21' the movement of the sensor members 51, 51' is not the direct result of the local forces dF as such, but of their moments dM about the pivot axes P, P', i.e. the product of the load arm between the pivots and the surface section by the component of the local force dF perpendicular to this load arm. The total moment M follows from the integration of this local moment over the full bottom surface 53. As the local forces dF are dependent on the friction coefficient ':', one may readily assume that the resulting total moment will equally be dependent on this coefficient μ.

The evolution of the flow velocity v and the local forces dF may be calculated from the equation of motion of the material along the curved surface. In the case of the surface 53 being a circular curve, a particular solution to the equation of motion is:

$$v^2 = [v_0^2 - g \cdot R \cdot (a \cdot \sin \delta - b \cdot \cos \delta) \cdot \exp(-2\mu \cdot \theta) + g \cdot R \cdot [a \cdot \sin(\delta + \theta) - b \cdot \cos(\delta + \theta)] \quad (1)$$

in which:

$$a = \frac{6 \cdot \mu^2}{1 + 4\mu^2} \quad (2)$$

$$b = \frac{1 - 2 \cdot \mu^2}{1 + 4 \cdot \mu^2} \quad (3)$$

and in which $v_0$ is the velocity of the material at the inlet portion 54 of the surface.

The general equation of motion is:

$$dm \cdot \left(\frac{dv}{dt}\right) = g \cdot dm \cdot \sin(\delta + \theta) - \mu \cdot dm \cdot \left[\left(\frac{v^2}{R}\right) - g \cdot \cos(\delta + \theta)\right]$$

in which dm represents the mass of bulk material at each incremental position along the length of the surface 53.

There is no general analytical solution to this complex equation, but the flow and force evolution may be obtained by numerical methods, i.e. by calculation of the various parameters at a surface angle θ and substitution of these values in the equation for a next, slightly greater angle θ+dθ.

Clearly the equation of motion will vary according to the shape of the surface 53. Other equations of motion may be derived for surface shapes other than the circular one shown in the illustrated embodiments.

The position of the pivot axis P may be defined relative to the centre C of the sensor surface 53 in polar co-ordinates ($R_i$, α), wherein $R_i$ is the ratio of the pivot distance to the surface radius R and α is the angle to the entry of the curved middle portion 55 (θ=0). The resulting moments M about the pivot axis P may be calculated from the force evolution for various values of inlet angle δ, surface angle θ$_m$, pivot position ($R_i$, α), inlet velocity $v_0$ and friction coefficient μ.

It has been proposed in European patent application no. 96201889.1 to identify an array of pivot points which have the specific property that the total moment M about one of these points is substantially insensitive to changes of the friction coefficient μ, i.e. when the mass rate of the conveyor is kept constant, the changes of the coefficient μ and the consequent changes to the flow pattern along the sensor surface 53, have no substantial effect on the value of the total moment M as sensed at the pivot P. Consequently a mass flow metering device 21, 21' which comprises such member 51 will yield a signal which is substantially insensitive to the changes in friction coefficient μ, which result from the changes in crop and harvesting conditions. Such device will not need recalibration as frequently as the prior art devices for obtaining a comparable reliability of the readings.

In the metering devices 21 and 21', illustrated in FIGS. 2 and 4, the inlet velocity $v_0$ of the material flow itself is friction dependent because of the action of the straight section 30 and the side walls 26 on the layer between the paddle conveyor 25 and the outlet opening 28. This friction-dependent velocity $v_0$ is the start velocity in the equation of motion referred to above and can be used for calculating the resulting moment M about various pivot axes P for various friction coefficients μ.

An analysis of the resulting total moment values shows that, for specific values of the distance ratio $R_i$, two optimal angles α$_1$, α$_2$ can be found for establishing a moment M which is only slightly influenced by changes of μ. These angles are listed below:

| $R_i$ | α$_1$ | α$_2$ |
|---|---|---|
| 1.25 | 47° | 148° |
| 1.50 | 40° | 155° |
| 1.75 | 34° | 160° |
| 2.00 | 30° | 164° |
| 2.25 | 27° | 168° |

These optimal locations for the pivot points are situated on or near the chain line 70 shown in FIGS. 2 and 5. This line 70 crosses the outlet of the sensor member 51 at about ⅘ of the way along the surface radius R from the centre of curvature C towards the surface 53 and has an angle of 7° to the tangent to the outlet portion 56. This is the array of optimal pivot points about which a total moment M can be measured which is substantially insensitive to changes of the friction coefficient $\mu$.

Figure 6:
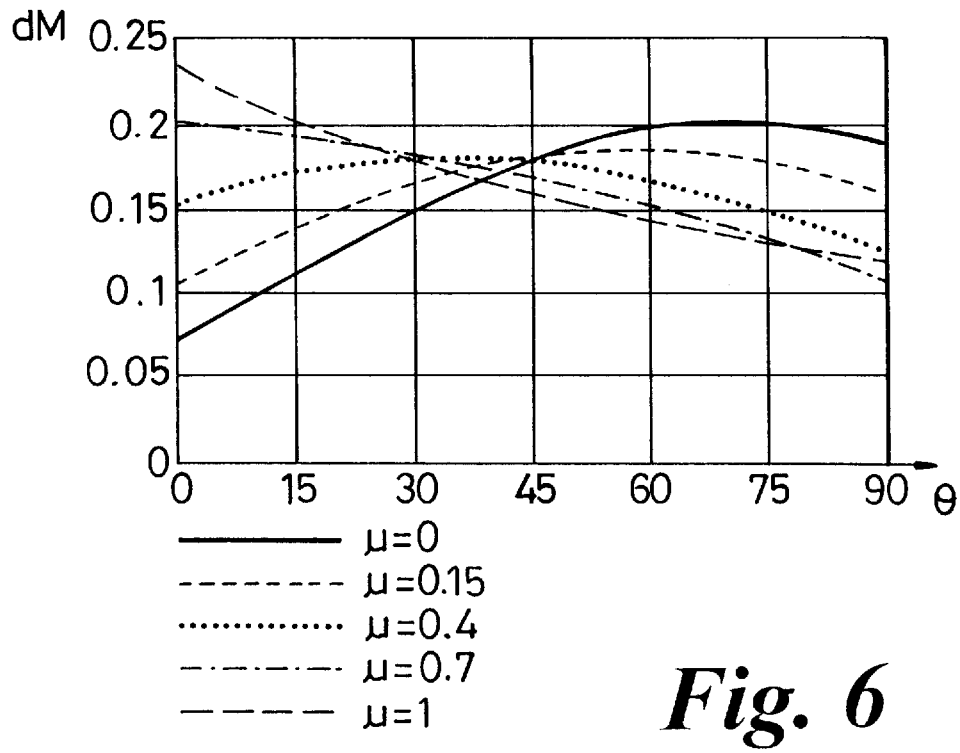
FIG. 6 is a chart representing the value of the local moment along the deflecting surface of the metering device of FIG. 2 for various friction coefficients.

FIG. 6 is a chart of the moments dM resulting from the local forces dF along the curved surface 53 of FIG. 2 for various values of $\mu$ in the range 0 to 1. The moments are established with respect to the optimal pivot point P. A high friction coefficient $\mu$ generates a high initial moment value dM, which decreases quickly along the sensor surface. A low friction coefficient $\mu$ generates a low initial moment value dM which increases to reach a maximum in the second half of the sensor surface. It will be appreciated that the graphs for different values of $\mu$ intersect in an area close to the bisector of the curved portions 55, 56 and that the surface under these graphs is substantially equal for all values of $\mu$. This confirms the low sensitivity to friction variations of this configuration. Similar charts can be drawn for other pivot points along the same line 70 of FIG. 2. However it is understood that the total value of the moment M will be relatively small in the immediate vicinity of the surface 53, such that it is advised to choose a pivot point which lies further away from this sensor member 51.

Figure 7:
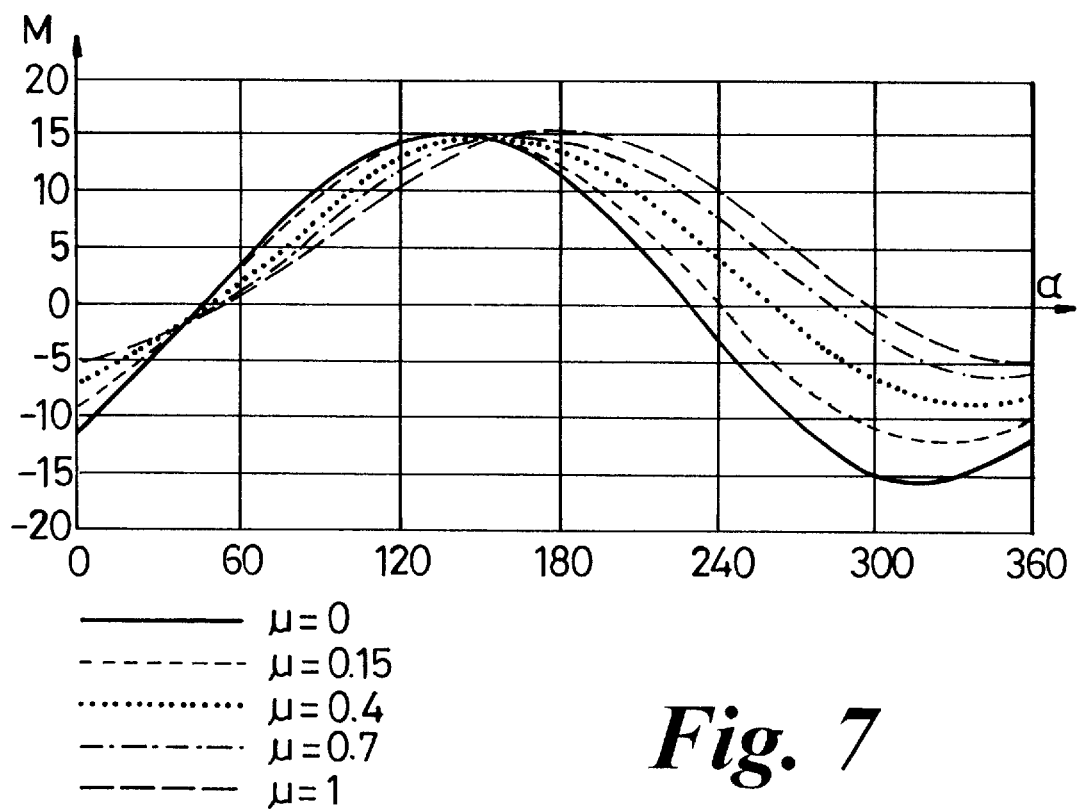
FIG. 7 is a chart representing the value of the total moment on the deflecting surface for various locations of the pivot axis and for various friction coefficients.

It has been proposed in co-pending European patent application no. 96201889.1 to choose a predetermined distance ratio $R_i$ and to calculate the total moment M of the forces on a curved surface 53 for various angles $\alpha$ and various friction coefficients $\mu$. The results from such calculation for the surface configurations of FIGS. 2 and 5 is shown in FIG. 7. The distance ratio has been set to $R_i=1.5$. The moment graphs for the various values of $\mu$ intersect in two areas, one in the first quadrant and the other in the second. The first intersection point lies at $\alpha=40$ degrees and the second at $\alpha=155$ degrees, which confirms the figures in the table above. However the total value M is much smaller at the first intersection point, such that it is preferable to select the intersection point in the second quadrant. Hence the preferred pivot point P is situated downstream the sensor surface 53 as in FIG. 2. The upper pivot point P' of FIG. 5 equally provides friction-independent mass flow measurement, but induces lower moment values M.

Solutions to Equation (1) and the force values derivable therefrom are strongly influenced by variations in the values of $\delta$ (the angle of inclination of the inlet 54 to the vertical) and $\theta_m$ (the angular length of the surface 53). Thus the methods described above of optimising $\alpha$ and $R_i$ with a view to minimising the effects of changes in $\mu$ may in accordance with the invention be augmented or replaced by methods of optimising $\delta$ and/or $\theta_m$ so that the effects of changes in $\mu$ are minimised.

A technique for achieving this includes determining the inlet velocity $v_0$ of material for a given, first value of $\mu$ and $\delta$ or $\theta_m$ (depending on which of the latter two parameters is to be optimised) and calculating from the $v_0$ value the velocity value at each of a plurality of points along the surface 53. This exercise involves use of the Equations (1) to (3) for a surface 53 in the form of a circular arc, but of course other equations of motion would be appropriate for different surface shapes.

The velocity values can then be used to establish force values dfα or moment values dM in respect of each point along the surface 53. The force values dF or moment values dM may then be integrated over the length $\theta_m$ for at least two values of $\theta_m$ or $\delta$ (as appropriate) and for at least two values of $\mu$. The resulting array of results indicates the values of $\theta_m$ or $\delta$ (as appropriate) corresponding to minimal effects of changes in:on the output of the sensor member. Such values of $\theta_m$ and/or $\delta$ may be incorporated in the design of surfaces 53 capable of providing voltage outputs indicative of force and/or moment measurements that are generally independent of the value of $\mu$. Such surfaces, and mass flow measurement devices incorporating them, are within the scope of the invention.

The total moment M of the mass flow forces on the sensor member 51 is proportional to the mass flow rate of the grain. This moment M is operable to produce a minimal deflection of the spring 66, 66' thus allowing a minimal angular displacement of said sensor member 51. This minimal displacement, which preferably is no more than e.g. 2 mm, is detected by means of the displacement sensor 52 which, in turn, generates an electrical voltage signal which equally is proportional to the mass of the grain issuing from the elevator 12.

The sensor 52 is coupled to e.g. a control box, comprising signal processing means for establishing the mass flow rate in accordance with the input from the sensor signal. These data may be accumulated to establish the total grain mass which has been collected in the grain tank over an area or time span. The product of the active width of the header by the actual ground speed of the combine harvester 1 is the area harvested per time unit. The division of the mass flow rate by this product results in the actual crop yield per area unit. This value in combination with the actual position of the harvester 1 can be used to establish a yield map for the whole field. The signal processing means comprise a microprocessor means, which are operable to read, process and store numeric data, command switches and display means for communicating a read-out to the operator.

In the examples described above the flow velocity at the entrance of the curved portions was dependent on the friction coefficient $\mu$, because of the flow of the material along the straight wall section 30) of the elevator housing 22. In cases where no such wall section is present or where its friction effect may be neglected, there will be a constant inlet velocity $v_0$ at the beginning of the curved surface 55, 56. The evolution of the flow velocity and the local forces dF may equally be calculated from an equation of motion of the material mentioned above for establishing the resulting moment M about a pivot point defined by its polar coordinates $(R_i,\alpha)$. As explained above it has been proposed in European patent application 96201889.1 to derive an array of optimal pivot points where the influence on the total moment M from changes to the friction coefficient $\mu$ is only marginal.

Figure 8:
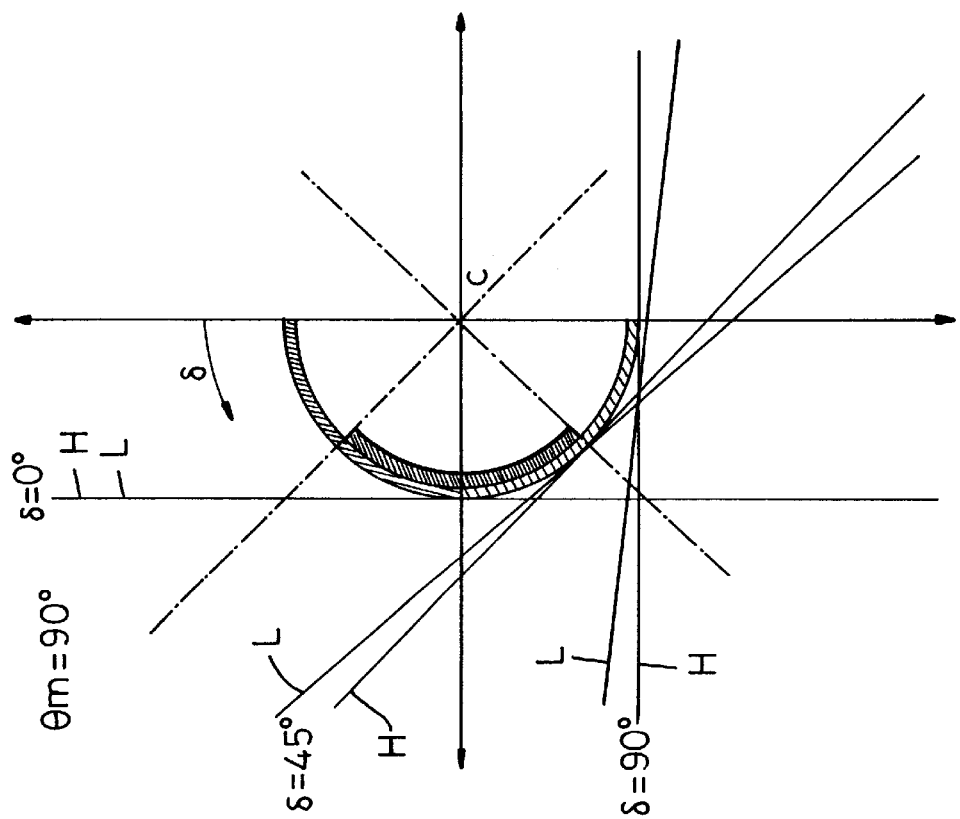
FIG. 8 is a schematic representation of the optimal locations for the pivot axis for various positions of the deflecting surface.

These arrays have been illustrated in FIG. 8 for various inlet angles $\delta$ and for high (H) and low (L) inlet velocities $v_0$, the high inlet velocity corresponding to the unpractical values of 40 m/s and higher and the low inlet velocity corresponding to the more conventional value of 5 m/s.

The curved surfaces shown in FIGS. 1 to 5 extend over total angle $\theta_m$ of 90 degrees. It is to be understood that their representation in this Figure is only schematic. For an inlet angle $\delta=0$ degrees and both high and low inlet velocities, the array takes the form of a vertical line which is tangent to the outlet portion of the curved surface.

For an inlet angle $\delta=90$ degrees and high inlet velocity, the optimal array forms a horizontal line, which equally is tangent to the outlet portion of the curved surface. For low inlet velocity, this array is a line which intersects said tangent in the proximity of the outlet portion and has an angle of substantially 7° thereto. For lower inlet velocities this line rotates even further in the direction of the vertical. This is the configuration of a gravitational chute which may be installed below the outlet of a vertical container or silo.

For an inlet angle δ=45 degrees, a high inlet velocity will result in an array in the form of the tangent to the outlet portion. At low inlet velocity this line is pivoted about substantially 5 degrees in the direction of the vertical.

More generally, an advantageous location for a pivot point P of sensor member with a curved flow surface is located in one of the sectors defined by a top on or adjacent said outlet portion, a first line parallel to the tangent to the outlet portion (for very high inlet velocities) and a second line obtained by the rotation of said first line over 15 degrees line in the direction of the vertical (for very low inlet velocities).

However, it is to be realised that in some situations there is limited freedom to choose an optimal pivot point P or force measurement direction α. Under such circumstances the optimisation technique of EP 96201889.1 may not in itself be suitable for defining a friction insensitive member.

Figure 9:
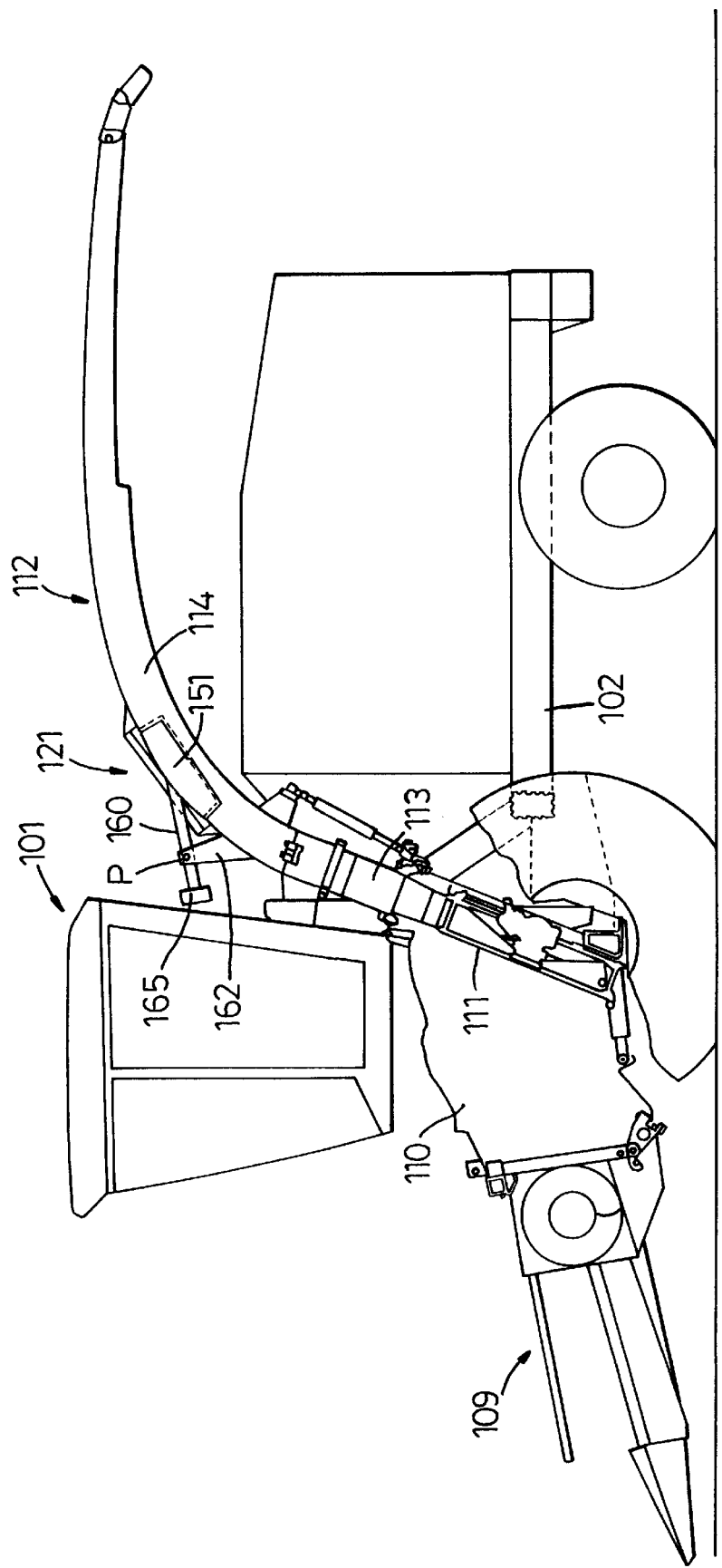
FIG. 9 is a side elevational view of a forage harvester, embodying a flow rate meter according to the invention.

FIG. 9 shows a further application of a mass flow metering device according to the invention. A forage harvester 101 comprises a main frame 102 to which are mounted ground engaging traction wheels and steering wheels. The forage harvester is shown equipped with a row crop attachment 109, suitable for the harvesting of corn, but which can be replaced with another type of attachment, depending on the type of crop to be harvested. The row crop attachment delivers the crop material to crop comminuting means installed in a front unit 110 of the forage harvester. The processed crop material is delivered to a blower rotor 111 which is installed within a blower housing, attached to the main frame 102. The blower rotor 111 throws said material upwardly into a discharge means 112, comprising a straight tube 113 and a curved discharge spout 114, which can be positioned by an operator to direct the cut crop material as required, normally into a wagon which is moving alongside or behind the forage harvester.

For similar purposes as in grain harvesting, the operator may want to assess the actual mass flow rate of the forage crop during normal harvesting operations. To this end a flow metering device 121 is installed on the spout 114. A substantially rectangular opening is provided in the curved upper portion of the spout 114. This opening is covered by a curved sensor member 151 with a generally U-shaped cross section. A support arm 160 is attached to the intermediate portion 54 of the sensor member 151 and is mounted for pivoting to a pair of upright arms 162 extending, from the lower portion of the spout 114. The inlet portion of this sensor member 151 is installed over the front edge of the spout opening and its outlet portion extends into the rear portion of the spout in order to ensure unhampered flow of the forage crop from the spout inlet to the spout outlet.

A counterweight 165 provided at the front end of the support arm 160, brings the centre of gravity of the sensor member assembly to its pivot axis P. A spring assembly (not shown) defines the zero load position of the sensor member 151 and its displacement under the action of the crop flow therealong is sensed by a displacement sensor (equally not shown).

This sensor member 151 is subject to the same centrifugal, friction and gravity forces from the crop material as the sensor member 51 described above. For this configuration also an array of optimal locations can be found for the pivot axis, about which a moment can be measured which is substantially independent of the friction factor: between the crop material and the metal of the sensor member 151. In this case also this array takes the form of a line in the vicinity of the tangent to the outlet portion of the curved member 151. However, once again, optimisation of the location of the pivot P of the direction in which the total force F is measured may not be practical in some designs of forage harvester. In such circumstances, a sensor member having a surface 53 optimised in accordance with the invention may be suitable.

In the mass flow metering devices described above, friction influences have been minimized by measuring a moment M about a properly set pivot point. A further analysis of the local forces dF on a curved sensor member reveals that the total force F resulting therefrom equally comprises a component $F_\alpha$ which is only slightly subject to changes to the friction coefficient $\mu$ between the bulk material and the sensor surface.

The angle α as seen from the centre C of a circular sensor surface is defined with respect to the entry inlet of the circular section (θ=0). $F_\alpha$ is the component of the total force F in the direction of α.

In the metering device described in European patent application 0,208,025, the sensor member was mounted for substantially linear displacement in the direction of the bisector of the sensor surface against the force of set of leaf spring's. This displacement is proportional to the force in the direction of the bisector and hence of the mass flow rate, but is not independent of variations of the friction coefficient.

Figure 10:
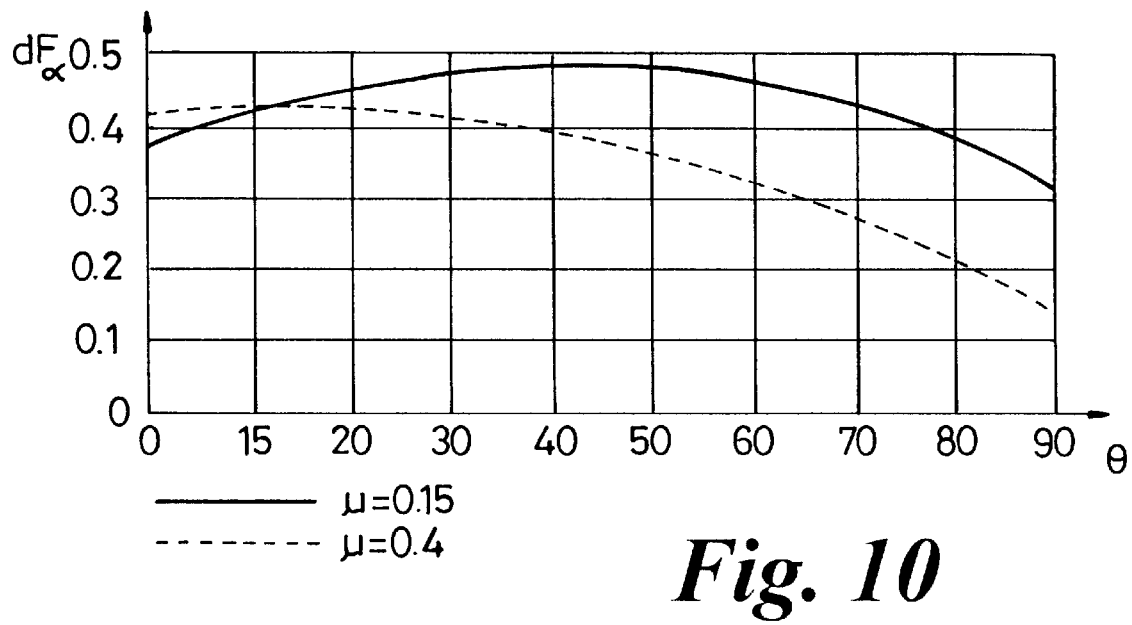
FIG. 10 is a chart representing the value of the force component in the direction of the bisector along the surface of the deflecting surface of FIG. 2 for various friction coefficients.

FIG. 10 shows the evolution of the local force component $dF_\alpha$ in the direction of the bisector α for a high and low friction coefficient $\mu$. The sensor surface extends over $\theta_m$=90 degrees and the force component extends in the direction α=45 degrees. The graphs for high and low friction coefficients $\mu$ do not intersect in the middle of the surface but about the angle θ=17 degrees. The total force component $F_{60}$ which is equal to the surface below the graph of the local force component $dF_\alpha$, is significantly greater in the case of a low: value than in the case of a high $\mu$ value. Hence, the direction of the bisector is not a appropriate force measurement direction for the compensation of friction coefficient variations.

Figure 11:
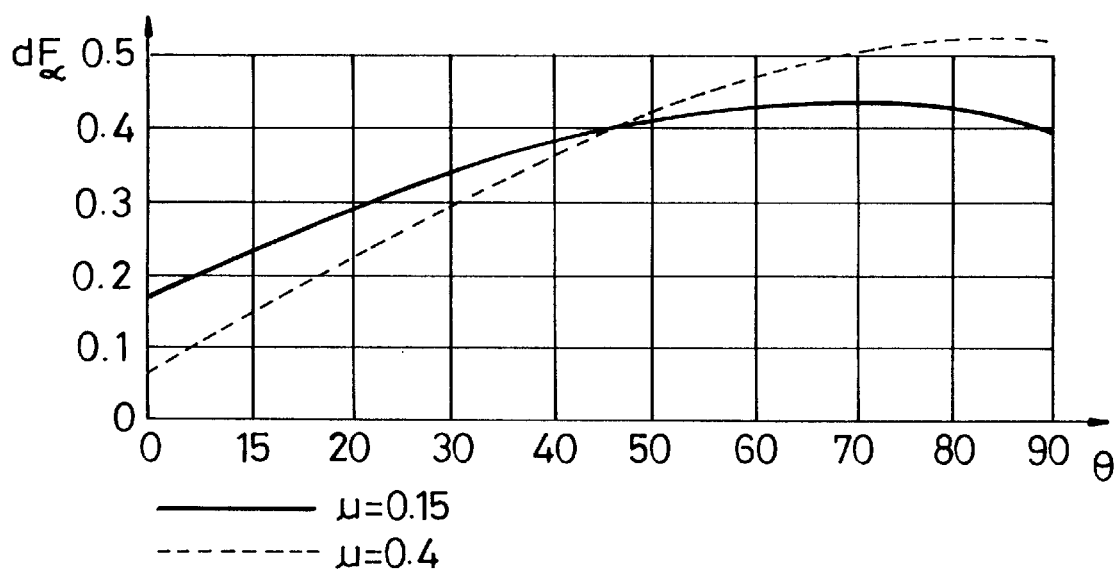
FIG. 11 is a chart representing the value of the force component in a direction perpendicular to the direction of the outlet of the surface of FIG. 2 for various friction coefficients.

For elimination of these friction effects, a direction α has to be established for which the graphs for various $\mu$ values intersect at about the middle of the sensor surface. FIG. 11 shows the graphs of the local force component $dF_\alpha$ in the direction perpendicular to the tangent to the outlet portion of the surface (α=90 degrees). The graphs for $\mu$=0.15 and $\mu$=0.40 intersect at about the bisector of the sensor surface and the surfaces below are substantially equal. Hence a force measurement in this direction of the outlet proves to be substantially insensitive to the effects of friction coefficient variations.

Figure 12:
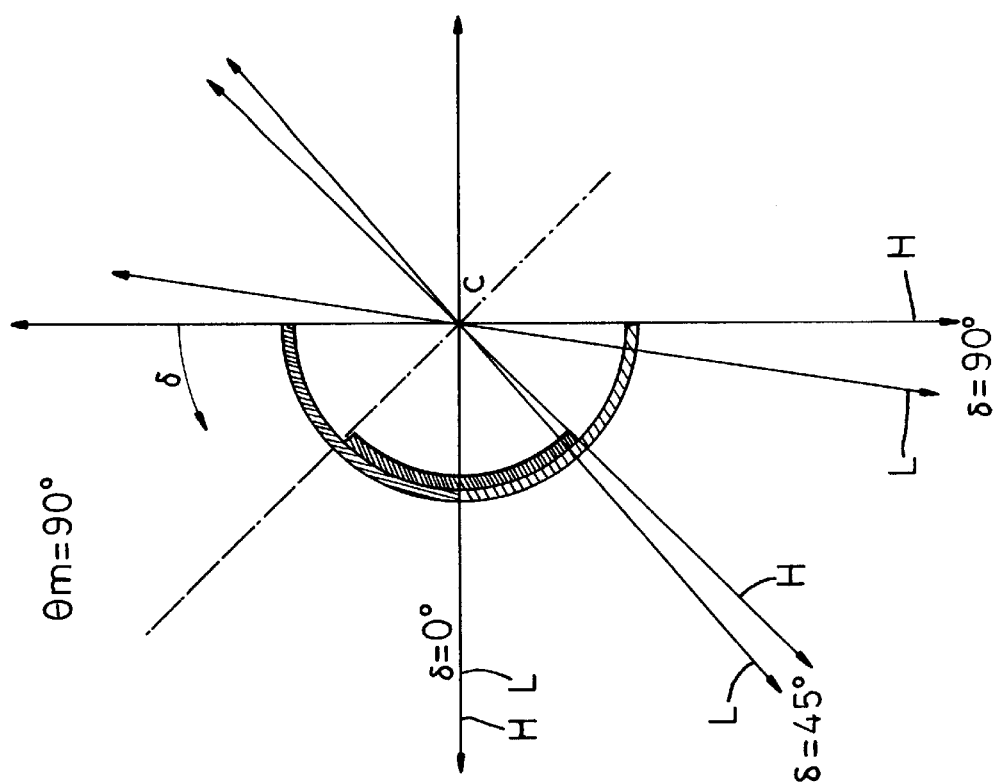
FIG. 12 is a schematic representation of the optimal direction of the force component for various positions of the deflecting surface.

FIG. 12 illustrates the optimal force measurement directions for various positions of a circular sensor surface extending over $\theta_m$=90 degrees and for various friction-independent inlet velocities. The optimal directions are shown for inlet angles δ equal to 0, 45 and 90 degrees and for a high inlet velocity (H) of more than 40 m/s and a low inlet velocity (L) of 5 m/s.

For an inlet angle δ=0 degrees and both high and low inlet velocities, the optimal direction is horizontal, i.e. perpendicular to the flow direction at the surface outlet or to the tangent to the outlet portion of the curved surface.

For an inlet angle δ=90 degrees and a high inlet velocity, the optimal measurement direction is vertical, which is equally perpendicular to the outlet portion of the curved surface. For low inlet velocity, this direction shifts about an angle of 7 degrees towards the horizontal. For lower inlet velocities this line rotates even further in the same sense. The surface is disposed as in a gravitational chute.

For an inlet angle δ=45 degrees, a high inlet velocity engenders an optimal measurement direction which is perpendicular to the tangent of the outlet portion. At low inlet velocity this line is pivoted about substantially 5 degrees towards the horizontal.

More generally, an advantageous direction for measurement of a force component on a sensor member with a curved flow surface is in the range between a first direction perpendicular to the tangent to the outlet portion and a second direction obtained by the rotation of said first direction over 15 degrees towards the horizontal.

Figure 13:
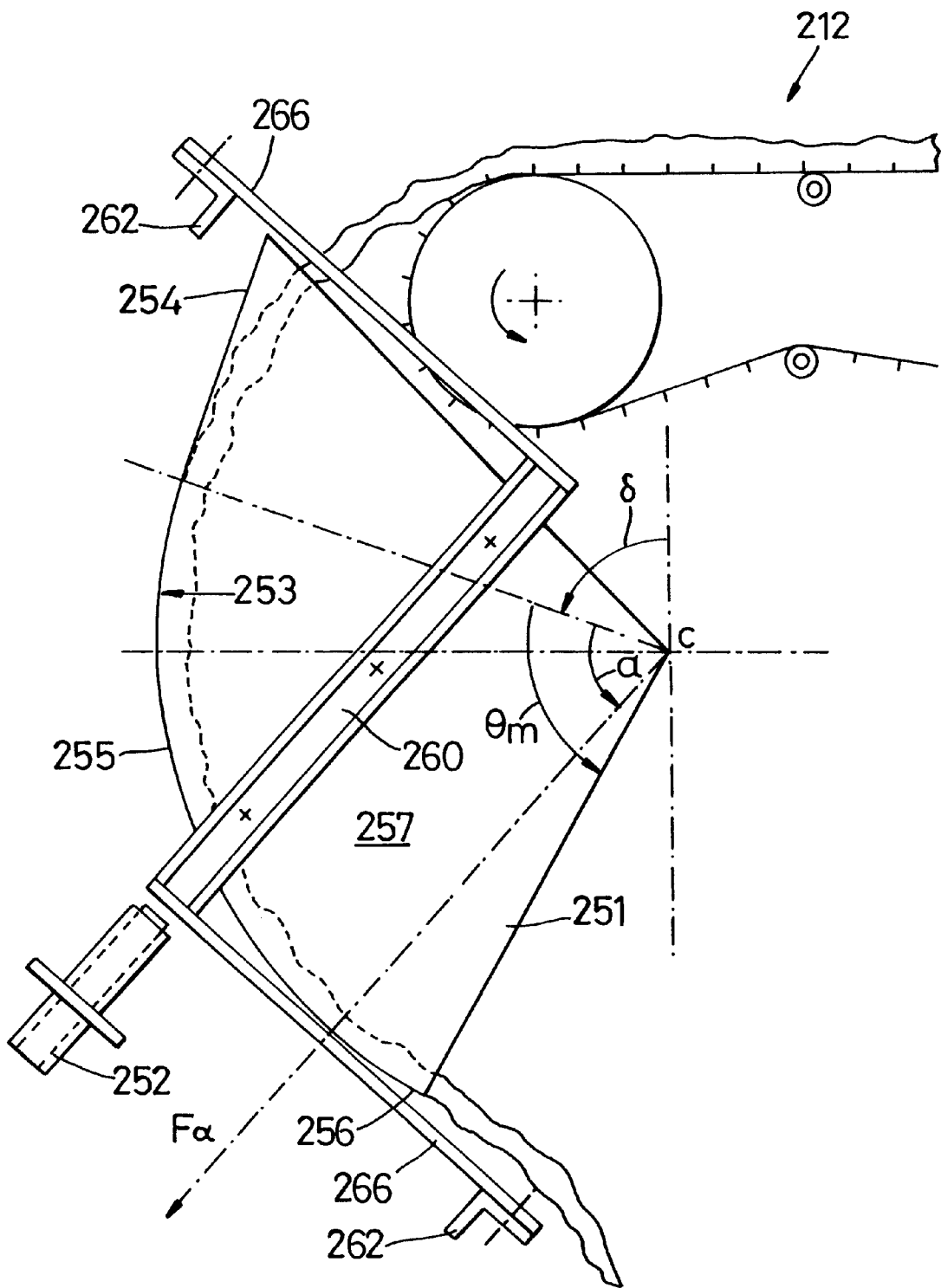
FIG. 13 shows a further embodiment of the present invention in combination with a belt conveyor.

A flow measuring (metering) device employing the measurement of a friction-independent force component is shown in FIG. 13. The metering device comprises a conventional belt conveyor 212 operable to convey bulk material at a constant belt velocity of 1 m/s to a sensor member 251 in the form of generally U-shaped chute, which is in many respects similar to the sensor member 51 of FIGS. 2 and 5. The sensor member 251 comprises a pair of parallel side walls 257 and a transverse sensor surface 253 in-between, constituted by a generally rectilinear inlet portion 254 and circularly curved middle and outlet portions 255, 256, which together extend over an angle $\theta_m$=80 degrees. This angle is smaller than in the previous cases in order to avoid excessive deceleration of the material near the outlet portion 255 and consequent plugging of the sensor member 251.

The bulk material is projected by the belt conveyor into the sensor member 251, which is positioned for obtaining a coherent material layer at the inlet angle δ, near the transition of the inlet portion 254 to the middle portion 255. The rectilinear portion 254 is disposed tangentially to the material flow in order to avoid material scattering away from the sensor surface 253.

A straight support arm 260 is mounted onto each side wall 257 at an angle α=67 degrees to the radius extending to upper end of the curved intermediate portion 255. The upper and lower ends of the arms 260 extend beyond the sensor member 251 and are attached to perpendicularly mounted leaf springs 266 of equal length, which are attached to angle irons 262 of a stationary frame (not shown). The action of the material flow on the sensor surface 253 effects a displacement of the sensor member 251 in the direction of the support arms 260. This displacement is proportional to the force component Fα which in turn is proportional to the mass flow rate. The displacement is captured by a distance sensor 252 which is coupled to electronic circuitry, comprising a microprocessor for the assessment of the actual mass flow rate.

This device measures the force component $F_\alpha$ in a direction which has angle of 13 degrees to the direction which is perpendicular to the tangent to the outlet. This force component is particularly insensitive to the effects of friction coefficient changes in the range of $\mu$=0 to $\mu$=0.7.

Although the present invention has been described with respect to a circularly curved and resiliently mounted sensor surfaces, other embodiments can be thought of without departing however from the original idea of the invention.

For example, one may consider to use a sensor member with a curved middle portion and a straight outlet portion and measure the force component of the material flow in a direction substantially perpendicular to the outlet direction. It is also conceivable to measure the moment of the sensor member about an axis which is chosen in the proximity of the line extending along the outlet portion.

The metering device may equally be equipped with transducers or load cells mounted to the sensor member, instead of displacement sensors. These transducers produce a signal proportional to the force thereon in a predetermined direction, and may comprise piezoelectric elements or strain gauges. In such cases it is no longer required to mount the sensor members to resilient means.

A friction-insensitive force component may also be established indirectly by proper combination of the force components in two different directions, which each may be sensed by force sensors disposed at different angles.

A sensor member may also be mounted to the main frame by a rigid torsion axle instead of a combination of a pivot means and a spring means. In this case the axle may be equipped with torque sensing means for establishing the total moment of the forces of the material flow along the sensor surface.

However, it may under some circumstances prove difficult or impossible to measure the force at the angle $\alpha_{opt}$ referred to. In such cases it as an alternative or an adjunct, be desirable to choose a value for δ or for $\theta_m$, determined in accordance with the method of the invention, to give rise to a surface 53 according to the apparatus of the invention the total moment and total force characteristics of which are generally independent of changes in the coefficient of friction between the material flowing along the surface and the surface itself.

Figure 14:
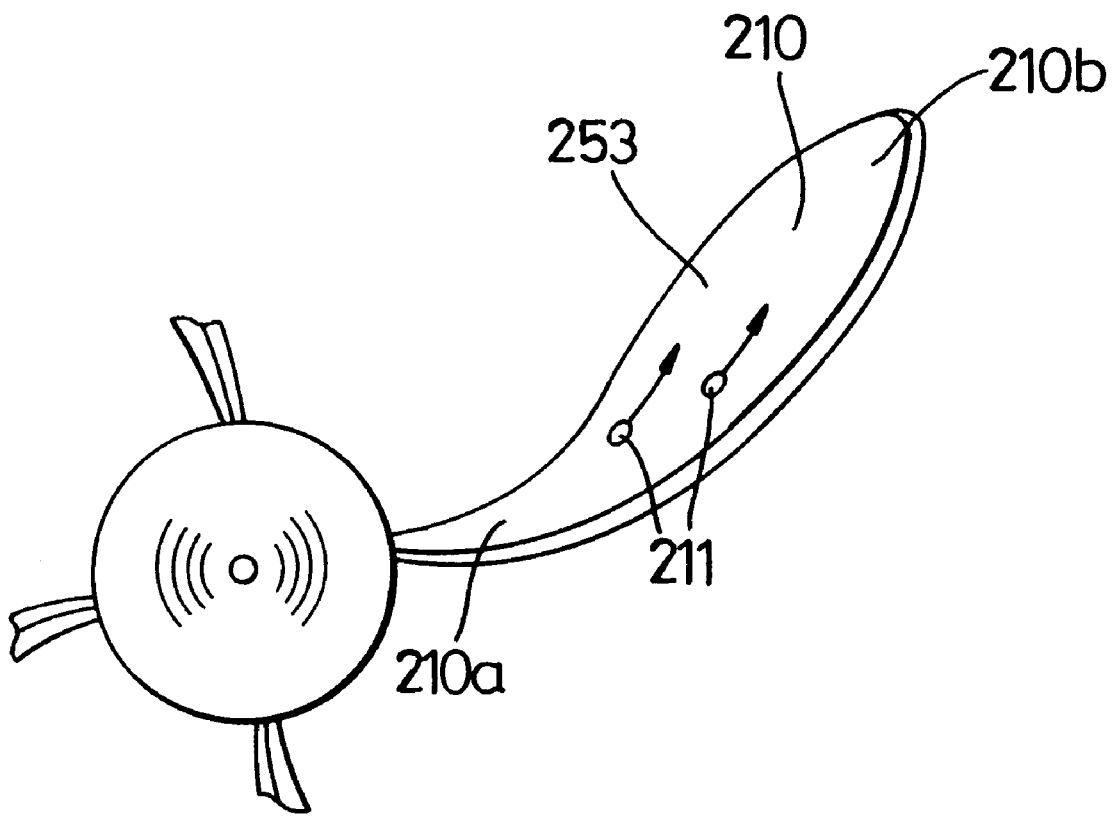
FIGS. 14 to 16 show examples of further surfaces and devices in accordance with the invention.

Also, of course, there may be situations in which the surface 53 is not intended to provide a mass flow measurement. FIG. 14 shows schematically an example of such a surface in the form of a blade 210 of a centrifugal impeller or propeller 212.

In the FIG. 14 embodiment, material 211 flows in a streamline flow from an inner region 210a of impeller towards the out edge 210b thereof. Thus the material flows along the surface 253 of blade 210 in a manner analogous to the flow of grain on surface 53 in the embodiments of FIGS. 1 to 13.

The shape of blade 210 may be defined by an equation. Since the effect of friction between the material 214 and the surface 253 is to cause variation of the velocity of material 211 as it travels along blade 210, the total force resulting from such friction may be analysed in accordance with the method of the invention as defined herein. From this it is possible to define e.g. a length $\theta_m$ of blade 210 that minimises the effects of changes in the coefficient of friction on the total force F.

A blade 210, thus designed, in accordance with the invention has the advantage that the total friction force experienced by the impeller 212 is invariant with changes in the friction coefficient. Thus it is not necessary for a motor (not shown) for driving the impeller or propeller to accommodate the range of torque values that would otherwise be required when the impeller is intended to operate under conditions of varying friction coefficient.

Figure 15A:
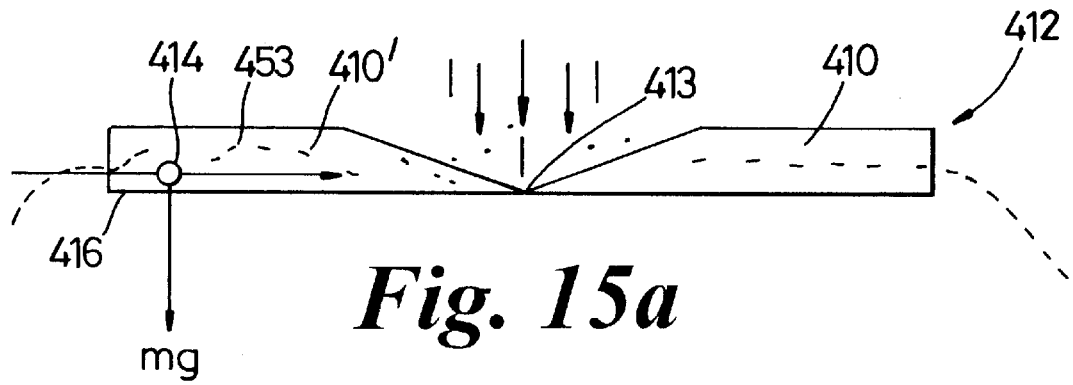
Figure 15B:
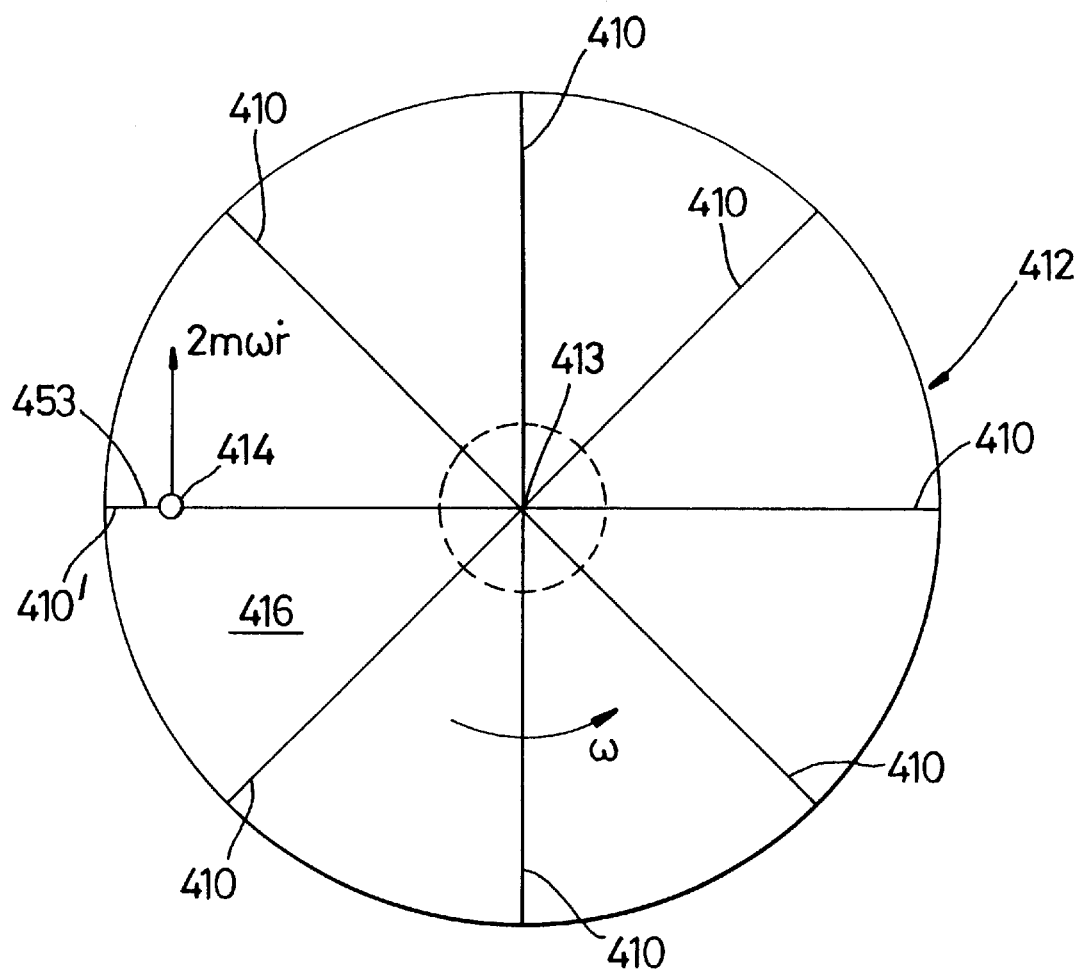

A further exemplary embodiment of the invention is shown in FIGS. 15a and 15b. The FIGS. 15 shows a coriolis mass flow meter 412 having a plurality of blades 410 each of radius R extending radially outwardly from a hub 413. The blades 410 are upstanding on a horizontal plate 416 that is capable of powered rotation at an angular speed ω.

It has previously been reported that a particle 414 of mass m on the plate 416 exerts a force (the coriolis force) of 2mω r on the blade 410' with which it is in contact, wherein r is the rate at which the particle 414 travels in the radial direction along surface 453 and ω is the angular or rotational speed. As shown in FIG. 15a, the particle 414 also exerts a gravitational force mg downwardly on the surface of the plate 416.

Figure 16A:
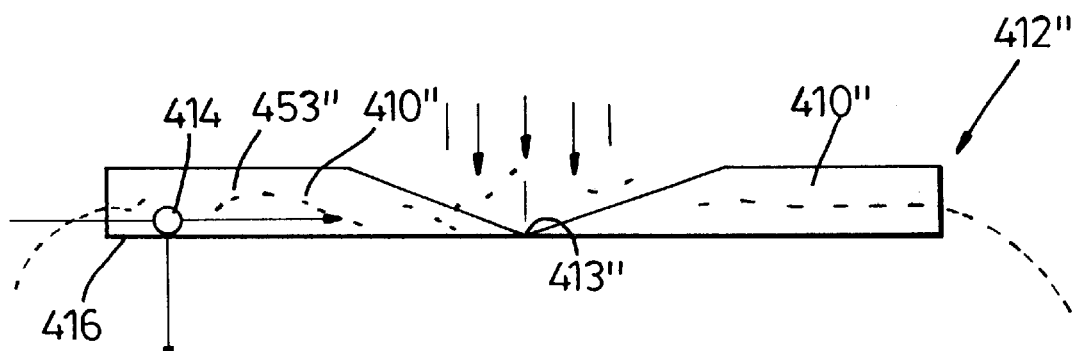
Figure 16B:
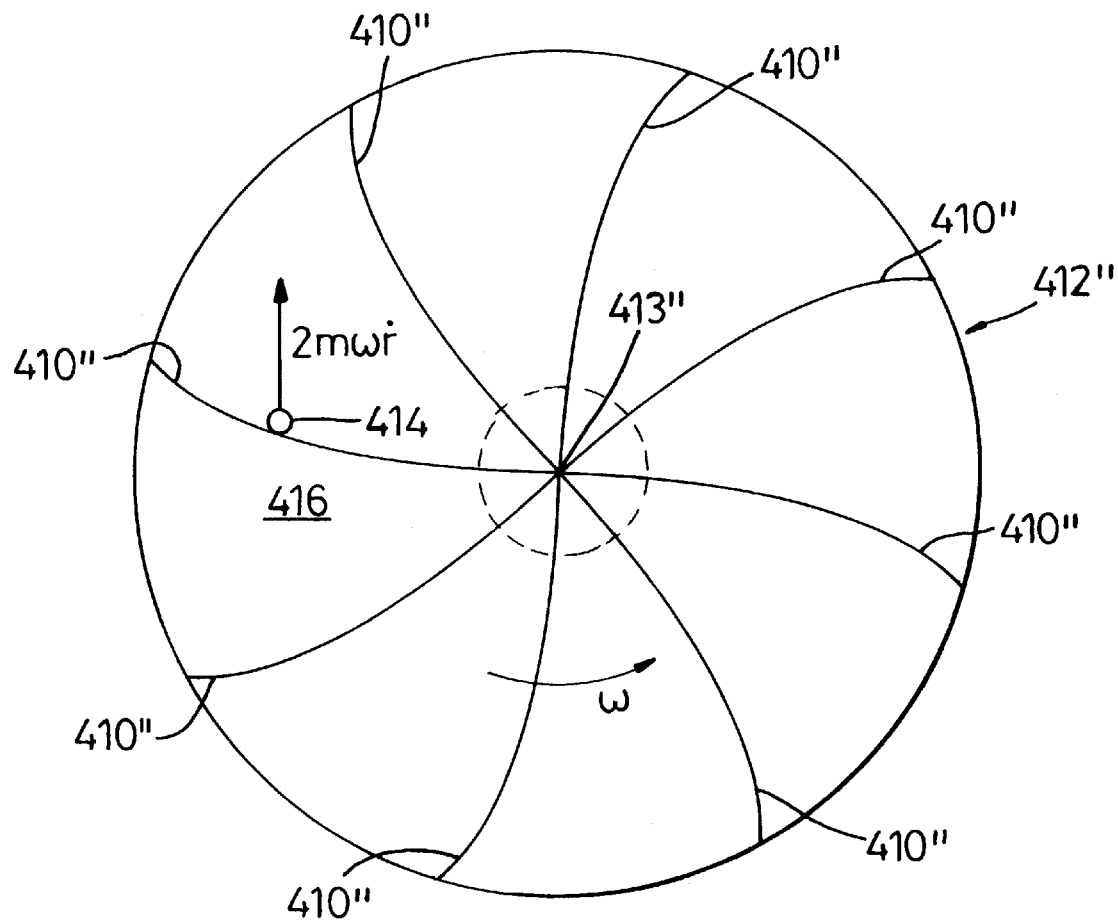

Thus, at first sight the torque needed to rotate the plate 416 and attached blades 410 varies only in proportion to the mass of the particle. This reasoning suggests that the hub torque in a mass flow measuring device such as device 410, in which a plurality of particles 414 flow onto the plate 416, is proportional to the mass flow rate of the particles, and that changes in the friction coefficient between the particle 414 and the surface 453 do not influence the torque. However, this analysis ignores the fact that the term $r$ given above is in fact determined by an equation of motion analogous to equation (1) above that is influence by $\mu$. Thus the coriolis mass flow measuring device only gives measurements that are independent of changes in the friction coefficient if its blades embody the principles of the invention. Such an arrangement is shown schematically in FIG. 16, in which the blades 410″ of the measuring device 412″ are curved and have angular lengths that cause the torque values (which may be sensed at hub 413″) to be independent of changes in $\mu$.

It will be obvious to those skilled in the art that various changes may be made without departing from the scope of the invention and the invention is not to be considered limited to what is illustrated in the drawings and described in the specification.

What is claimed is:

1. A member comprising a surface permitting streamline flow of bulk material along its length, the member being retainable in an apparatus the functioning of which depends on a force acting on the member, said force resulting from flow of bulk material along the surface, the member being such that for a given mass flow rate of bulk material the force is substantially independent of the coefficient of friction between the bulk material and the surface, characterised in that the length of the surface is chosen so as to minimise the effect of changes in the coefficient of friction on the force.

2. A member comprising a surface permitting streamline flow of bulk material along its length, the member being securable in an apparatus the functioning of which depends on a force acting on the member, said force resulting from flow of bulk material along the surface, the member being such that for a given mass flow rate of bulk material the force is substantially independent of the coefficient of friction between the bulk material and the surface, wherein
   i) the surface includes an inlet portion at an end thereof, and
   ii) the normal to said end of the surface is inclined at an angle to a reference direction, characterised in that the angle is chosen so as to minimise the effect of changes in the coefficient of friction on the force.

3. The member according to claim 2 wherein the surface is a curve.

4. The member according to claim 3 wherein the curvature of the surface is concave.

5. The member according to claim 4 wherein the curvature of the surface is defined by an algebraic function.

6. The member according to claim 5 wherein the surface includes a planar portion.

7. The member according to claim 6 wherein the surface includes a combination of at least one curve and at least one planar portion.

8. The member according to claim 7 constituted as a sensor member of a mass flow measuring device.

9. The member according to claim 8 supported for pivoting movement, in response to said force, about an axis.

10. The member according to claim 9 wherein the displacement of the member in response to the force is measurable as an indicator of the magnitude of the force.

11. The member according to claim 9 wherein the force on the surface is directly measurable.

12. The member according to claim 11 constituted as a blade of a centrifugal impeller.

13. The member according to claim 11, when configured as a blade of a propeller.

14. The member according claim 11, when configured as a blade of a coriolis mass flow meter.

15. A method of providing a member, comprising the steps of:
   (i) determining a plurality of velocity values corresponding to the velocity of the material at each of a plurality of positions along the surface for a first value of friction coefficient between a material and the surface of the member, and for a first value of the length of the surface;
   (ii) using the velocity values to determine the force acting on each of a plurality of elements of the surface;
   (iii) integrating the force values, or further parameter values derived therefrom, over the length of the curved surface, whereby to obtain a total force value or total further parameter value;
   (iv) repeating steps (i) to (iii) for a at least one further friction coefficient value, whereby to obtain a plurality of total force or total further parameter values;
   (v) repeating steps (i) to (iv) for a plurality of further values of the length of the surface;
   (vi) identifying one or more optimal values of the length of the surface for which the total force values or total further parameter values corresponding to the different friction coefficient are generally the same; and
   (vii) manufacturing a member the surface of which is of a said optimal length.

16. The method of providing a member according claim 15, comprising the further steps of:
   (i) determining a plurality of velocity values corresponding to the velocity of the material at each of a plurality of positions along the surface, for a first value of friction coefficient between a material and the surface of the member, and for a first value of the angle ($\delta$) of inclination of an inlet of the surface relative to a reference direction;
   (ii) using the velocity values to determine the force acting on each of a plurality of elements of the surface;
   (iii) integrating the force values, or further parameter values derived therefrom, over the length of the curved surface, whereby to obtain a total force value or total further parameter value;
   (iv) repeating steps (i) to (iii) for at least one further friction coefficient value, whereby to obtain a plurality of total force values or total further parameter values;
   (v) repeating steps (i) to (iv) for a plurality of further values of the angle of inclination of an inlet to the surface;
   (vi) identifying one or more optimal values, for the angle of inclination of the inlet, for which the total force values or other parameter values corresponding to the different friction coefficient value are generally the same; and
   (vii) manufacturing a member an inlet to the surface of which is inclined at a said optimal angle.

17. The method according claim 16 comprising the further step of supporting the member in a mass flow measuring device.

18. The method according claim 17 wherein the member is supported for pivoting movement in a mass flow measuring device.

19. The method according to claim 18 wherein the member is supported for measurement of the total force in a direction that gives rise to total force values that are generally insensitive to changes in the friction coefficient.

20. The method according to claim 19 wherein the determining step includes the step of determining the plurality of velocity values from the equation of motion of the material along the surface.

21. The method according to claim 20 including iterative determination of the velocity values using numerical methods.

22. The method according to claim 21 employing the velocity of material at an inlet of the surface as the start velocity in the equation of motion.

23. The method according to claim 22, wherein the further parameter is a torque.

24. The method according to claim 23 including the step of providing a detector for forces acting on the member.

25. The method according to claim 24 wherein the step of manufacturing the member includes the step of forming a curved portion of the surface.

26. The method according to claim 25 wherein the surface of the member is curved, the radius of curvature of the surface having a fixed, predetermined length.

* * * * *